United States Patent
Nishimura et al.

(10) Patent No.: US 7,176,881 B2
(45) Date of Patent: Feb. 13, 2007

(54) PRESENTATION SYSTEM, MATERIAL PRESENTING DEVICE, AND PHOTOGRAPHING DEVICE FOR PRESENTATION

(75) Inventors: Mitsuyoshi Nishimura, Saitama (JP); Junichi Yokoyama, Saitama (JP); Takashi Nagashima, Saitama (JP)

(73) Assignee: Fujinon Corporation, Saitama (JP)

( * ) Notice: Subject to any disclaimer, the term of this patent is extended or adjusted under 35 U.S.C. 154(b) by 392 days.

(21) Appl. No.: 10/431,507

(22) Filed: May 8, 2003

(65) Prior Publication Data

US 2003/0210229 A1 Nov. 13, 2003

(30) Foreign Application Priority Data

| May 8, 2002 | (JP) | 2002-132327 |
| Jun. 14, 2002 | (JP) | 2002-174184 |
| Jun. 27, 2002 | (JP) | 2002-187111 |
| Sep. 26, 2002 | (JP) | 2002-281208 |
| Oct. 2, 2002 | (JP) | 2002-289402 |
| Mar. 31, 2003 | (JP) | 2003-094271 |

(51) Int. Cl.
G09G 5/00 (2006.01)

(52) U.S. Cl. ...... 345/156; 345/157; 345/158; 345/179; 345/180; 353/42; 348/744

(58) Field of Classification Search ........ 345/156–158, 345/179–183; 353/42; 348/744
See application file for complete search history.

(56) References Cited

U.S. PATENT DOCUMENTS 5,115,230 A * 5/1992 Smoot ............ 345/9
5,235,363 A * 8/1993 Vogeley et al. ............ 353/122
5,973,672 A * 10/1999 Rice et al. ............ 345/158
6,100,881 A * 8/2000 Gibbons et al. ......... 715/500.1
6,346,933 B1 * 2/2002 Lin ............ 345/157
6,906,702 B1 * 6/2005 Tanaka et al. ............ 345/175
7,027,041 B2 * 4/2006 Nishimura et al. ......... 345/178

FOREIGN PATENT DOCUMENTS

| JP | A 3-201707 | 9/1991 |
| JP | 02000076010 A * | 3/2000 |
| JP | A 2000-115603 | 4/2000 |
| JP | A-2000-259338 | 9/2000 |
| JP | B2 3201707 | 6/2001 |
| JP | A 2001-299262 | 10/2001 |
| JP | A 2002-216470 | 8/2002 |
| JP | 02002325200 A * | 11/2002 |

* cited by examiner

*Primary Examiner*—Amr A. Awad
*Assistant Examiner*—Sameer Gokhale
(74) *Attorney, Agent, or Firm*—Oliff & Berridge, PLC

(57) ABSTRACT

A presentation system comprises a display for setting a virtual screen, a pointing mark for operating a point on the display, a photographing device for photographing the pointing mark and the display, a displaying device for displaying a predetermined image or the photographed image photographed by the photographing device, and a control device. The control device calculates coordinates of the pointing mark on coordinates of the virtual screen and has a pointing function for synthesizing a predetermined point image at coordinates of the image on the displaying device, which correspond to the coordinates of the pointing mark.

24 Claims, 31 Drawing Sheets

Fig. 13A
Fig. 13B
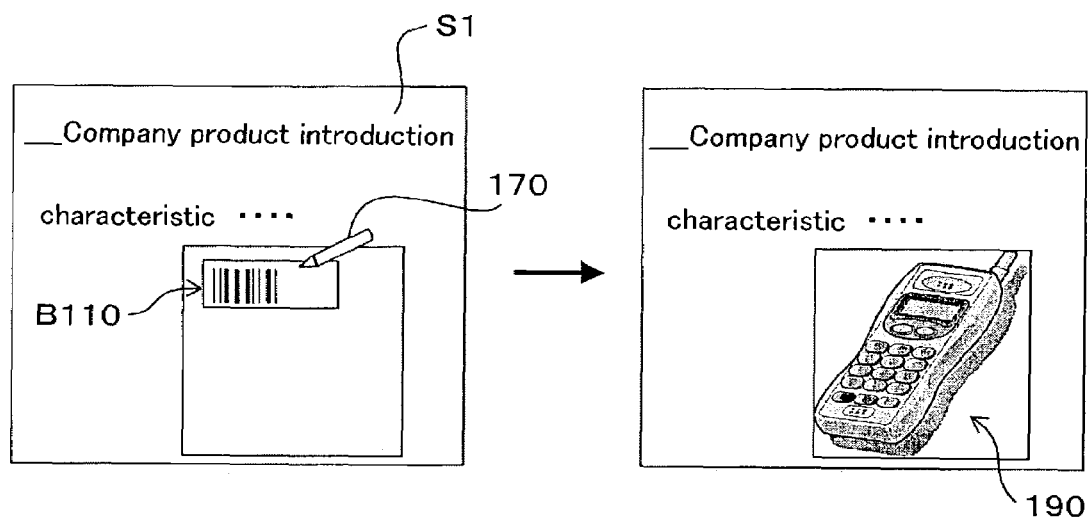
Fig. 14
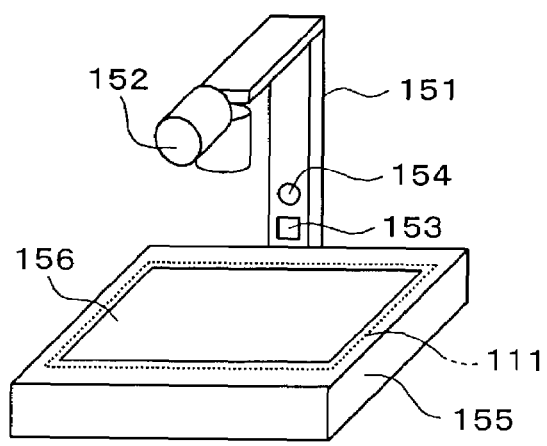

transform mirror image to normal image transform mirror image to normal image and rotate through angle of 180°

PRESENTATION SYSTEM, MATERIAL PRESENTING DEVICE, AND PHOTOGRAPHING DEVICE FOR PRESENTATION

BACKGROUND OF THE INVENTION

1. Field of the Invention

The present invention relates to a presentation system, a material (document) presenting device, and a photographing device for presentation.

2. Description of the Related Art

In a presentation, reference images may be displayed to an audience by displaying documents photographed by a document photographing apparatus on a screen, by reflecting a display of a personal computer on a screen, and by other methods. A laser pointer which indicates a point on the image on the screen by projecting a laser beam is often used. A laser pointer of this type has, however, the following disadvantages. Shaking greatly and adversely influences the pointing operation, thereby making the point unstable. Also the laser beam may be erroneously projected to be hazardously incident on the eyes of the audience. To overcome these disadvantages, the applicant proposed, in Japanese Patent Unexamined Application Publication No. 2001-299262, a system in which a presenter virtually performs a pointing operation on a virtual screen generated near a presenter, using a pointing mark, a camera photographs the presenter's actions, and the pointing mark is reflected as a point image on a projected image on a screen.

In the improved technique described above, however, the pointing operation is indirect. Due to this, it is difficult to indicate the point swiftly, and it is insufficient to suppress shaking.

In recent years, material (document) presenting devices are used in presentations, instead of OHPs (overhead projectors) which were widely used. A material (document) presenting device has a dynamic image camera, such as a video camera, which recognizes the materials as objects. Some of the material presenting devices are equipped with a material mounting pedestal on which materials are mounted. These material presenting devices are used to project a material image photographed by a camera, from a projecting device, for example, a liquid crystal projector, onto a screen.

In a presentation, the presenter who is explaining often explains by indicating (pointing to) a specific part. In this case, the presenter indicates the part by directly touching the material with a pen or an indication rod, by using a digitizer as an external device, or by other methods.

However, the method of indicating a part by directly touching the material causes a problem as described below. That is, the image of the material cannot be clearly shown since the shadow of the indication rod or the hand of the presenter falls onto the screen. On the other hand, although this problem does not occur when using a digitizer, it is necessary to buy the digitizer separately. Due to this, the material presenting device is caused to be larger, and new problems, such as storing the device, thereby occur.

In a presentation, a material presenting device may be used as one of the devices for projecting an image onto a screen. For example, as disclosed in Japanese Patent Unexamined Application Publication No. 2000-115603, a material presenting device may be equipped with a camera above a material mounting pedestal, the material prepared by the presenter and/or the presenter is photographed by the camera, and the photographed image is projected onto the screen.

According to the above-described material presenting device, the body of the camera is supported by an oscillating mechanism and the photographing direction of the camera is switched between the material direction and the presenter direction. With this structure, however, the harness of the camera may be twisted and broken. In addition, the material presenting device may be large since the oscillating mechanism for tilting the body of the camera is complicated.

In a presentation, a material presenting device may be used as a device for projecting an image onto a screen. The material presenting device may be equipped with a camera photographing a material and a display on a material mounting pedestal (for example, Japanese Patent Application Publication No. 3201707). According to the material presenting device, a material such as a document is placed on the material mounting pedestal, and the presentation can be performed while the photographed image of the material by the camera is projected onto the screen. In addition, the image photographed by the camera can be displayed on a display.

According to the above-described material presenting device, the number of switches for indicating or selecting functions increases as the number of functions increases. Therefore, the manufacture of the device incurs high cost, and it is difficult for the operator to understand the operating method thereof, whereby the operator may easily make mistakes in the operation. Thus, displaying the setting menu was proposed so as to reduce the number of switches. However, displaying the setting menu requires a setting place for an input device such as a mouse, a keyboard, or a touch panel, for indicating or selecting on the displayed setting menu. In addition, the manufacturing cost is increased since the touch panel is expensive.

Various safe pointing systems have been proposed, instead of one using a laser pointer, because a laser beam may be erroneously projected to be hazardously incident on the eyes of the audience. The applicant proposed, in Japanese Patent Unexamined Application Publication No. 2002-216470, a system in which a presenter virtually performs a pointing operation on a virtual screen generated near a presenter, using a pointing mark, a camera photographs the pointing mark, and the coordinates of the pointing mark on the virtual screen are calculated, a point image is generated on the coordinates, and the point image is synthesized with a material image projected onto a screen. According to the system, the presenter virtually performs a pointing operation on the virtual screen, using the pointing mark, whereby the point image is generated on the screen as if the presenter performed pointing on the screen.

In the above system, the pointing mark is positioned one by one at two reference points which are the relative diagonal points of the virtual screen, the camera photographs the relative reference points, and the coordinates of the virtual screen are generated based on these reference points. In this case, in order to clearly photograph the pointing mark, the pointing mark is composed of an emitting object which emits light at a specific wavelength (for example, infrared light). On the other hand, an optical filter for allowing infrared light to pass therethrough, which enables photographing of the pointing mark, is removably provided in the photographing optical path. The optical filter is placed in the photographing optical path when the virtual screen is generated. In addition, while the pointing operation is performed using the pointing mark, the optical filter is placed in the photographing optical path of the camera, so that the pointing mark is clearly photographed, and the background is not projected onto the screen.

In normal photographing, such as photographing the material or the presenter, the optical filter is removed from the photographing optical path of the camera. On the other hand, in generating the virtual screen or performing a pointing operation, that is, photographing the pointing mark (photographing infrared light), the optical filter is placed in the photographing optical path of the camera. Thus, the optical filter must be removably placed in the photographing optical path. The operation of the optical filter is troublesome if the operation is performed by hand. The structure of the device is complicated if a driving mechanism is provided and, moreover, the operation is electrically-driven under remote control. In addition, in both cases, the operation is time consuming, and ease of use of the system is not satisfactory.

SUMMARY OF THE INVENTION

An object of the present invention according to an aspect of the invention is to provide a presentation system using a virtual screen, in which a sense of direct indicating can be obtained and shaking can be reliably suppressed.

An object of the present invention according to another aspect of the invention is to provide a presentation system which not only enables performance of a pointing operation on a specific part accurately and clearly but can also make a presentation more flexible and, moreover, and does not cause a material presenting device to be of increased size.

An object of the present invention according to another aspect of the invention is to provide a material presenting device which enables incident light from a plurality of directions to enter into a photographing device such as a camera with a simple structure and prevent breakage of, for example, the harness thereof.

An object of the present invention according to another aspect of the invention is to provide a material presenting device which can eliminate the problem of the set place of an inputting device and the problem of manufacturing cost, and can reduce the number of switches of the device.

An object of the present invention according to another aspect of the invention is to provide a photographing device for presentation which can swiftly and smoothly switch between normal photographing and specific wavelength light photographing, and can be of simplified design.

The present invention provides a presentation system comprising: a display for setting a virtual screen; a pointing mark for operating a point on the display; a photographing device for photographing the pointing mark and the display; a displaying device for displaying a predetermined image or a photographed image photographed by the photographing device; and a control device. The control device calculates coordinates of the pointing mark on coordinates of the virtual screen and has a pointing function for synthesizing a predetermined point image on coordinates of the image on the displaying device, which correspond to the coordinates of the pointing mark. The displaying device of this invention is, for example, a screen onto which an image is projected from a projector such as a liquid crystal projector, or a television and a liquid crystal display which display an image by inputting image data thereinto.

According to the present invention, the pointing operation is performed by moving the pointing mark on the display on which the virtual screen is set, and the pointing mark is displayed as a predetermined image on the displaying device. The pointing mark is indicated directly on the display, and the display and the virtual screen correspond to each other. Thus, the pointing operation can be performed to give a sense of directly indicating. In addition, shaking does not occur and shaking correction by image processing therefore is not necessary.

The point image can be displayed in a shape ranging from not only a normal point but also as an arrow, a line, a hand, or a circle. In addition, it may be possible to draw by connecting movements of the coordinates of the point image end to end.

The photographing device may comprise an optical filter which allows the photographing device to photograph only light of a specific wavelength and which can be removably placed in a photographing optical path, and the pointing mark may be composed of a light emitting section for emitting light including light of a specific wavelength. The light of a specific wavelength may be infrared light. According to this embodiment, the pointing operation may be performed by using the light emitting section, while the optical filter may be placed in the photographing optical path of the photographing device. The photographing device can photograph only the light emitting section, and the pointing mark can be distinguished reliably. Thus, it is easy to generate the point image.

Furthermore, according to the present invention, an image displayed on the display may be one generated by a personal computer, one made by synthesizing a point image with an image generated by the personal computer, one photographed by the photographing device, or one made by synthesizing a point image with an image photographed by the photographing device. In particular, when an image generated by a personal computer is displayed, the pointing mark may be controllable by a mouse. In this case, the control device may calculate the distance of movement of the pointing mark and transmit the distance of movement as mouse data to the personal computer.

Predetermined data and data characteristic information related to the predetermined data may be registered in the control device. On the other hand, resources of an image on the display store the data characteristic information in an information form such as a bar code, a two-dimensional bar code, a character or a mark, and when the position of the information form in the image on the display may be indicated, the control device recognizes the information form through the photographing device and outputs the predetermined data related with the information form. On the side of the photographing device, the resources of an image on the display may be a material which may be an object of the photographing device, and the information form may be stored on the material by printing or applying a seal. The resources of an image on the display may be image data generated by the personal computer when an image on the display of the personal computer is to be displayed. The information form may be synthesized with the image data and stored. The predetermined data may be an image data or voice data. The image may be displayed on the display or the displaying device. The voice may be output by a voice generating device such as a speaker.

In addition, according to the present invention, the data characteristic information as the information form may be a command executing function. The command executing function may be, for example, page information such as advancing or returning a page, or a function that an operation of simultaneously outputting the voice and the image may be indicated to and executed by the control device or the personal computer though the control device.

In addition, according to the present invention, since the photographed image is distorted when the photographing device photographs the display obliquely, it may be necessary to transform to the two-dimensional coordinates, which are set on the photographed image, by correcting. At least light emitting points are provided at three of four corner points of the display, and the area, in the shape of a trapezoid, is thereby set by the photographed emitting points.

The present invention further provides a presentation system comprising: a photographing section for photographing a material; a pointing mark photographed by the photographing section; a control section for generating a point image by transforming the position of the pointing mark to screen coordinates of an image displaying device; an image synthesizing section for synthesizing the point image with an image supplied by the photographing section or an image maintaining device other than the photographing section; and an image outputting section for outputting the image synthesized by the image synthesizing section to the image displaying device.

According to the present invention, a presenter operates a pointing mark instead of a conventional indication rod. When the photographing section photographs the pointing mark, the position of the pointing mark is transformed to the screen coordinates of the image displaying device by the control section, and the point image is generated at the position of the screen coordinates. The point image is synthesized with the image supplied by the photographing section or the image maintaining device other than the photographing section and is displayed on the image displaying device. That is, the movement of the pointing mark is reflected as the point image on the display image. Thus, when the pointing mark is operated, a "pointing operation" for indicating the point image can be performed at the required position.

In this case, when the image supplied by the image maintaining device other than the photographing section is displayed by the image displaying device, the point image is synthesized with the display image. On the other hand, when the image by the photographing section is displayed on the image displaying device, the display image is temporally maintained as a static image, and then the pointing mark is photographed by the photographing section. As a result, the point image is synthesized with the maintained image which is photographed by the photographing section. In this case, for example, when a material is photographed and processed to produce a static image, the material can be directly indicated on by the pointing mark.

According to the present invention as described above, since the present invention differs basically from the conventional method of directly indicating a material by touching with a pointing rod, the problem that the pointing rod and the hand prevent an image of the material from being seen does not occur, and it is thereby possible to perform a pointing operation on a specific part accurately and clearly. In addition, it is not necessary to use an external device such as a digitizer, and it is possible to apply a conventional image processing technique, whereby the presentation system can be composed inexpensively and not cause a device to be larger.

In order to synthesize the point image with the display image, a predetermined range in an angle of view of the photographing section may be set on a virtual screen, and the pointing mark may be shown on the virtual screen. If a photographing direction of the photographing section can be changed arbitrarily, for example, the photographing direction may be directed toward the presenter, and the virtual screen can be set within the angle of view. In this case, the material may not be indicated on by the pointing mark, and the pointing operation may be performed by moving the pointing mark on the virtual screen. In addition, the photographing section can photograph, for example, the circumstances in a meeting and the audience by changing the photographing direction of the photographing section, and the audience can perform pointing operations on the display image. Thus, it is possible to make the presentation more flexible.

The image maintaining device of the present invention may be composed of a personal computer, an external memory device provided in a material presenting device which may be used in the present invention, or an internal memory device provided therein.

The pointing mark can be easily seen and the point image can be easily generated as the pointing mark of the present invention may be specifically reflected in the photographing section with respect to a background. The pointing mark may be composed of a reflecting object which has a high reflectance with respect to the background, a light emitting object which may be bright with respect to the background and is illuminated or flickers, or an object which may be of different color from the background color.

When the pointing mark may be composed of the light emitting object which flickers, the light emitting object may be composed to be recognized as the pointing mark based on the flickering cycle of the flickering light emitting object, whereby the pointing mark can be recognized more reliably. For example, if the photographing section photographs the flickering light emitting object and searches for the illuminated position by comparing brightness data when lit with brightness data when not lit, the influence of the noise by the light of the background may be reduced.

According to the present invention, the point image, which the pointing mark is reflected as on the image displayed by the image displaying device, may be composed of an arbitrary shape such as a dot, a circle, an arrow, or a line. The point image can be made to be a continuous line by following the movements of the pointing mark.

In addition, according to the present invention, predetermined data and data characteristic information related to the predetermined data may be registered in the control section. On the other hand, resources of an image on the image displaying device store the data characteristic information in an information form such as a bar code, a two-dimensional bar code, a character or a mark, and when the position of the information form in the image on the displaying device may be indicated, the control section recognizes the information form through the photographing section and outputs the predetermined data related with the information form.

The present invention further provides a material presenting device comprising: a material mounting device on which material which may be a document is mounted; a photographing device for photographing the material on the mounting device; and an optical path switching device which switches a direction of an optical path in which light enters into the photographing device to a direction different from a material photographing optical path.

According to the present invention, a direction of an optical path in which light enters into the photographing device is switched by an optical path switching device, and it is therefore not necessary to tilt the photographing device such as a camera when changing the light direction. Thus, the harness of the photographing device is not twisted, whereby problems such as breakage of the harness can be prevented and the structure of the material presenting device is simplified since the oscillating mechanism of the photographing device is not needed.

The optical path switching device may comprise a reflector and a supporting arm which can removably position the reflector in the material photographing optical path, thereby simplifying the structure thereof. The supporting arm may be provided not only in the material mounting device but also in a supporting device for supporting the photographing device, and the photographing device. On the other hand, the arm may be simply composed to rotatably support the reflector, and the reflector may be removably positioned in a material photographing optical path by rotating around the arm, whereby the optical path switching device can switch the direction of the optical path in which light enters into the photographing device to a direction different from a material photographing optical path.

In addition, in the case in which the reflector can be removably positioned by the supporting arm, the reflector may be preferably supported to rotate around the supporting arm. The light from a plurality of directions other than a material, for example, a direction of a presenter or a direction of an audience, can enter into the photographing device. In this case, the optical path switching device may comprise a holding device for holding the reflector at a plurality of angle positions with respect to the supporting arm. The holding device may be preferably composed of a latch mechanism which can removably engage the reflector with the supporting arm at a plurality of angle positions with respect to the supporting arm. For example, a recessed portion may be provided at either the supporting arm or the reflector, and a protrusion which engages with the recessed portion elastically may be provided at the other one. For example, the protrusion may be composed of a ball plunger which is urged in the direction of projection by an elastic member As described above, if a reflector is used, the light entering into the photographing device may be reflected by the reflector. In this case, the material presenting device may be preferably equipped with a control device which transforms an image inverted by the reflector to a normal image. In addition, the control device may preferably transform the direction of top and bottom to the normal direction thereof if the direction of top and bottom of the image which enters into the photographing device via the reflector is rotated.

In the material presenting device as described above, the frame and the reflector can be a mirror unit. In this case, the mirror unit may be provided in a conventional material presenting device, whereby the function of the present invention can be added. For example, a bracket which can be mounted on the arm supporting the photographing device or the material mounting device may be made, and the supporting arm may be movably supported by the bracket. The supporting arm may be rotatably or slidably supported by the bracket, whereby the reflector may be removably provided in the optical path which extends from the material to the photographing device. Alternatively, the supporting arm may be simply composed to support the reflector so as to be rotatable, the reflector may be removably positioned in the material photographing optical path by rotating around the supporting arm, whereby light from a plurality of directions other than from the material can enter into the photographing device.

The present invention further provides a material presenting device comprising: a material mounting device on which a printed copy is mounted; a displaying device for displaying an image, the displaying device is provided on or adjacent to the material mounting device; and a photographing device for photographing the displaying device; a pointing device for pointing on the displaying device; and a control device for displaying a plurality of command images on the display and for performing a process specified by the command image when an operation for indicating a process on one of the command images is performed by the pointing device.

According to present the invention, when the operation of indicating the process on one of the command images is performed by the pointing device, the process specified by the command image is performed, and the command image thereby performs the function of switch. Thus, physical switches such as push buttons and dials can be omitted by increasing the number of software switches. For example, switches of, for example, a focus and a zoom of the photographing device and a light for lighting a material, which are very often used, are provided as physical switches, and, on the other hand, switches which are rarely used (for example, a selection switch of outputting an image ) are provided as a command image. The number of the switches is thereby reduced, it is easy to use the device, and the appearance of the device is improved. In addition, peripherals such as keyboards and a setting place therefor are not needed, and the cost does not increase, compared to the case of using the touch panel.

According to the present invention, the material presenting device can be easily used by systematically arranging the command images, since the menu is provided in the command image and the selection in the menu is performed using the pointing mark. In this case, it is further possible to set a menu at a lower menu level.

In addition, the coordinates of the pointing device on the displaying device can be calculated to specify the command image to which the pointing device is indicating. In this case, the control device sets two-dimensional coordinates on a photographed image photographed by the photographing device and calculates coordinates on the photographed image of the pointing device. The control device performs a process specified by the command image which corresponds to the calculated coordinates.

The photographing device may comprise a filter which can allow to pass light of a specific wavelength and which can be removably positioned in an optical path of the light. The pointing device may emit light of a specific wavelength. With this structure, since the emitting section of the pointing device may be photographed via the filter, the coordinates of the emitting section can be calculated accurately. In addition, the material presenting device further may preferably comprise light emitting sections for emitting light of a specific wavelength at opposite angle positions of the displaying device at least. In this case, the control device may set the two-dimensional coordinates, based on the positions on the photographed image of the emitting sections, which are photographed by the photographing device. The light of a specific wavelength may be preferably composed of infrared light.

Since the photographed image is distorted when the photographing device photographs the displaying device obliquely, it may be necessary to transform to the two-dimensional coordinates by correcting. One or two emitting sections are provided at one or two corner points of the displaying device, and the area, in the shape of a trapezoid, is set by the photographed emitting sections.

The present invention further provides a photographing device for presentation comprising: a photographing optical path extending from an object to a photographing optical path, the optical path divided into a path for normal photographing and a path for photographing light of a specific wavelength; and a photographing device in the path for normal photographing and a photographing device for photographing light of a specific wavelength.

According to the present invention, the photographing device for presentation is switched between using the image photographed by the photographing device provided in the path for normal photographing and the image photographed by the photographing device for photographing light of a specific wavelength, whereby the photographing device for presentation can be swiftly switched between normal photographing and specific wavelength light photographing. Therefore, the invention does not require switching operation for the optical filter which is removably positioned in the optical path so as to switch between normal photographing and specific wavelength light photographing. In addition, since the device for removably placing in an optical filter is not needed, the structure of the photographing device can be designed simply.

An optical filter which can allow light to pass therethrough of a specific wavelength may be provided in the photographing optical path for photographing light of a specific wavelength so as to form a photographing optical path for specific wavelength light photographing. In addition, the photographing optical path extending from the object to the photographing optical path may be divided into a path for normal photographing and a path for photographing light of a specific wavelength by a beam splitter which may be for dividing light into a light component of a specific wavelength and another light component. In this case, an optical filter may not be needed, whereby the structure of the photographing device may be designed more simply, and light can be effectively used. The specific wavelength light of the present invention may be infrared light.

BRIEF DESCRIPTION OF THE DRAWINGS

FIG. 13 is a schematic diagram showing an application example of the function of bar code outputting, FIG. 13A shows a state in which the pointer indicates the bar code in a material image of a display, and FIG. 13B is a display image synthesized with an image related to the bar code in the first embodiment according to the present invention;

FIG. 14 is a perspective view of the other arrangement of a display in the first embodiment according to the present invention;

DESCRIPTION OF THE PREFERRED EMBODIMENTS

Embodiments of the present invention will be described hereinafter with reference to the drawings.

(1) First Embodiment

Figure 1:
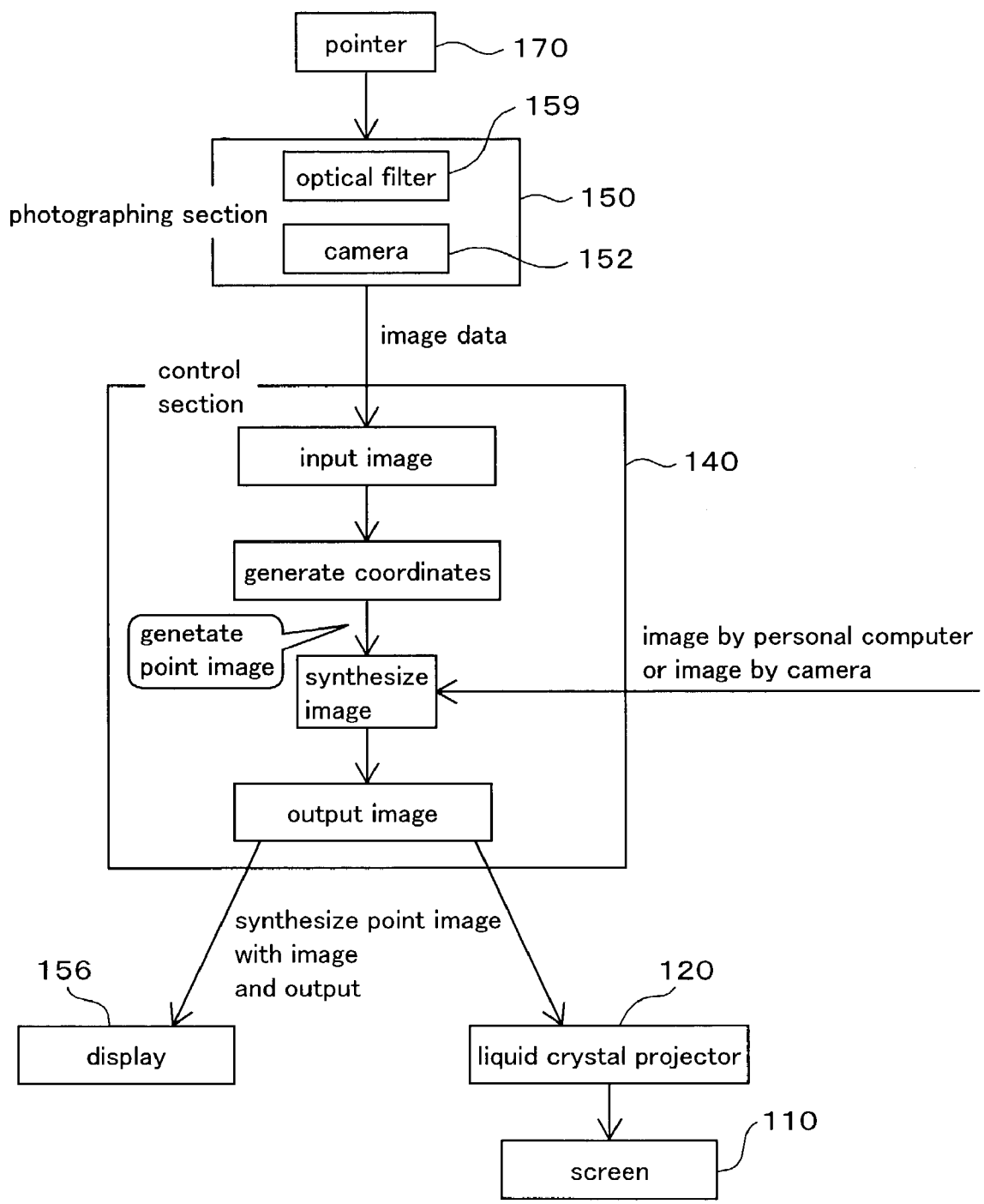
FIG. 1 is a diagram showing a configuration and a function of a presentation system systematically in the first embodiment according to the present invention.
Figure 2A:
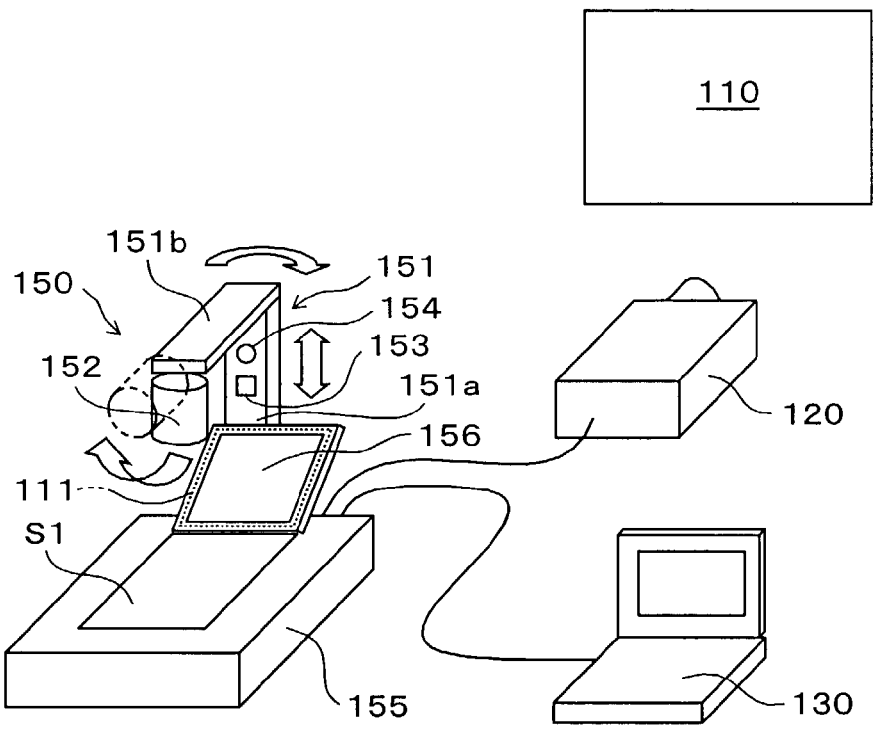
FIG. 2A is a perspective view showing one concrete arrangement of the configuration of the system schematically in the first embodiment according to the present invention and FIG. 2B is a perspective view of the pointer in the first embodiment according to the present invention.

FIG. 1 systematically shows a configuration and a function of a presentation system in a first embodiment according to the present invention. FIG. 2A shows one arrangement of the configuration of the system schematically. As shown in the figures, the system comprises a screen (displaying device) 110, a liquid crystal projector 120, a personal computer 130 of a note type, a control section (control device) 140 and a photographing section 150.

Figure 3:
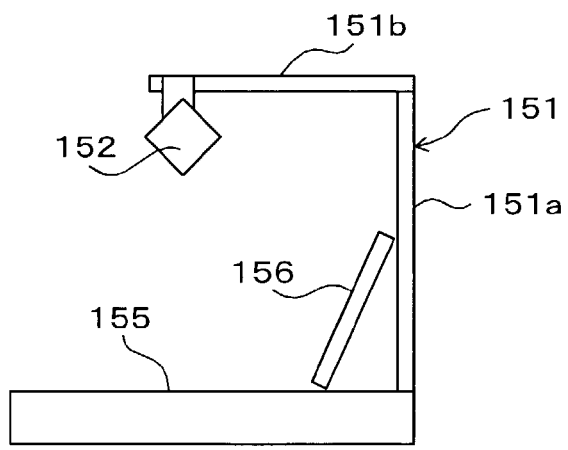
FIG. 3 is a side view showing a photographing section of the system in the first embodiment according to the present invention.

The photographing section 150 comprises a document photographing apparatus. As shown in FIG. 2A and FIG. 3, the document photographing apparatus is equipped with a manuscript pedestal 155, a camera (photographing device) 152 supported by the manuscript pedestal 155 via an arm 151, and a display 156. The arm 151 has an inverted L-shape composed of a vertical portion 151a extending vertically and a horizontal portion 151b at the upper end of the vertical portion 151a. The horizontal portion 151b extends forward of a presenter (not shown). The vertical portion 151a is extendible, and the horizontal portion 151b is rotatable with respect to the vertical portion 151a. The extension and retraction of the vertical portion 151a and the rotating of the horizontal portion 151b are performed by hand, and can be fixed at an arbitrary position. A document S1 is put on the manuscript pedestal 155. A display 156 is provided at the back side of the document S1 and is set at an inclined attitude. A back light (not shown), which is used if the document S1 is a transparent manuscript, is provided in the manuscript pedestal 155. The control section 140 is provided in the manuscript pedestal 155.

Image data is generated by the personal computer 130, which is input into the control section 140 and is processed therein. The image data processed by the control section 140 is displayed as an image on the display 156, or is output to the liquid crystal projector 120 and then the image based on the image data is projected onto the screen 110 from the liquid crystal projector 120.

The camera 152 is provided at the leading end of horizontal portion 151b of the arm 151 via a pedestal to reciprocate so that the photographing direction can be directed downward in the forward or backward directions within the range of an angle of about 180°, and the position of the camera 152 can be changed by hand and then be fixed at an arbitrary position within that range. An optical filter (shown as reference numeral 159 in FIG. 1) is removably provided in a photographing optical path. The optical filter enables the camera to photograph only infrared light, which is invisible, of a specific wavelength. In this case, the optical filter 159 is removably put in the photographing optical path by hand. The camera 152 has a zoom function and an auto-focus function. A photographed image by the camera 152 is input into the control section 140 as image data. The image data processed by the control section 140 is output to the liquid crystal projector 120, and the image based on the image data is projected onto the screen 110 from the liquid crystal projector 120.

Figure 2B:
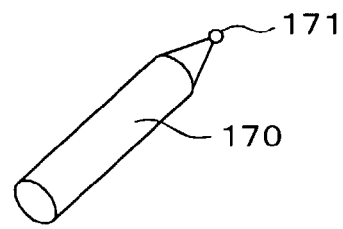

FIG. 2B shows a pointer 170 of a pen type which is used by the presenter with the hand. An emitting section 171 emitting infrared light, which is composed of a light emitting diode, is provided at the tip end of the pointer 170. The emitting section 171 emits invisible light including infrared light, which is transmitted through the optical filter 159. The pointer 170 is used by pressing the emitting section 171 on the document S1 which is on the display 156 or the manuscript pedestal 155. The pointer 170 has a built-in press switch which is changed to ON when the emitting section 171 is pressed.

A function switching button for switching the functions of the pointer 170 is provided therein. The relative functions are described below.

(a) Image Switching Function

The image switching function is for switching the images projected from the liquid crystal projector 120 onto the screen 110 between the image of personal computer 130 and the image of the camera 152.

(b) Point Function

The point function is for projecting a predetermined point image onto the screen 110, corresponding to the pointing position of the emitting section 171 which emits light.

(c) Handwriting Function

The handwriting function is for generating a continuous line by moving the emitting section 171 which emits light on the display 156, thereby drawing characters or the like.

(d) Mouse Function

The mouse function is for transmitting mouse data corresponding to the pointing position of the emitting section 171 which emits light and for performing a mouse operation (such as pointer moving, clicking, range designating by these operations, image scrolling, and page turning) in the same manner of clicking as in conventional mouse operations.

If the function switching button for performing the relative functions is pressed, the emitting section 171 emits light including infrared light. The emitted light is received by a light receiving 153 provided at the arm 151, which is composed of a photodiode, and input into the control section 140 as a function signal.

The control section 140 generates XY coordinates of a virtual screen 111, corresponding to the display 156 photographed by the camera 152, by an ordinary image processing method. The method of generating the virtual screen 111 is explained hereinafter. As shown in FIG. 4, the emitting points 156a of infrared light, which are invisible, are provided at the four corner points of the display 156. The camera 152, with the optical filter 159 positioned in the photographing optical path, photographs the emitting points 156a, and the positions of the emitting points 156a are recognized by the image data. The recognition of the emitting points 156a by the camera 152 is notified by flickering of a recognition displaying section 154, which is composed of such as a light emitting diode provided at the arm 151, for a predetermined time.

Figure 4A:
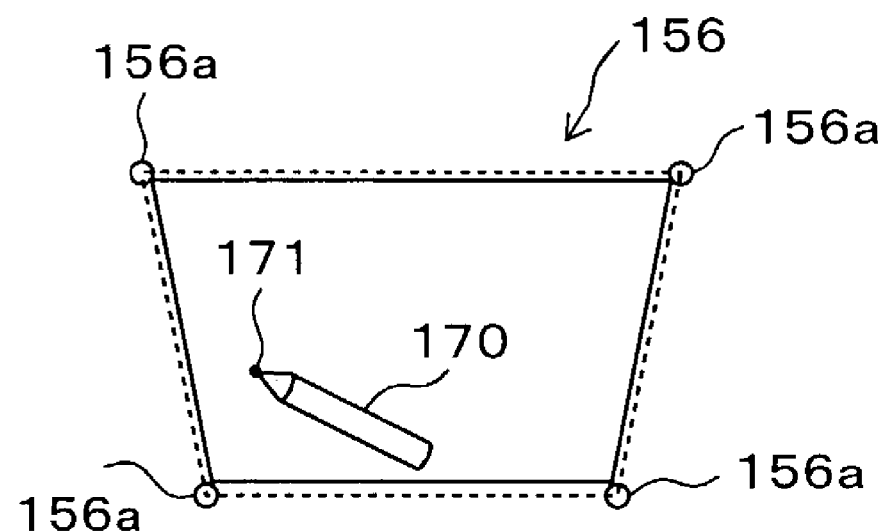
FIG. 4 is a diagram explaining setting of a virtual screen and correction of distortion of the virtual screen in the seventh embodiment according to the present invention.
Figure 4B:
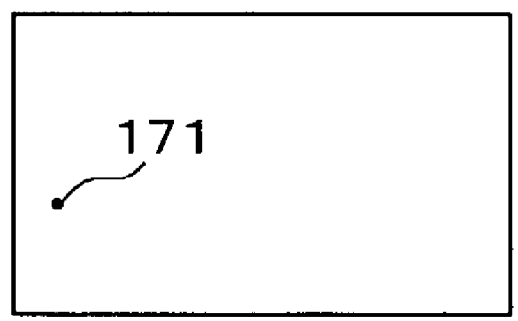

Since the display 156 is inclined backward and is above from the viewpoint of the presenter, the shape (corresponding to the display 156) made by connecting the emitting points 156a of the four corner points is distorted into a trapezoid shape within the view angle of the camera 152, as shown FIG. 4A. In this case, the control section 140 generates the XY coordinates of the virtual screen 111 of which the distortion is corrected by an image processing technique, based on the positions of the relative emitting points 156a of the four corner points, as shown in FIG. 4B. In addition, the correction of the coordinates is performed by applying a method in which the display 156 emits white light, and the display area of the display 156 thereby differs from the frame of the display 156 in contrast color, wherein the display area is recognized.

The position of the emitting section 171 of the pointer 171 on the virtual screen 111, that is, the display 156, is photographed by the camera 152, the image data is input into the control section 140, and the control section 140 sequentially calculates the coordinates of the light emitting section 171 on the coordinates of the virtual screen 111. The control section 140 processes the image data (image data on the personal computer 130 or the camera 152) and the coordinate data on the light emitting section 171, and synthesizes the point image on the calculated coordinates of the light emitting section 171. The zoom function and the auto-focus function of the camera 152 are controlled by the control section 140 so as to search for the emitting section 171 automatically.

Figure 5:
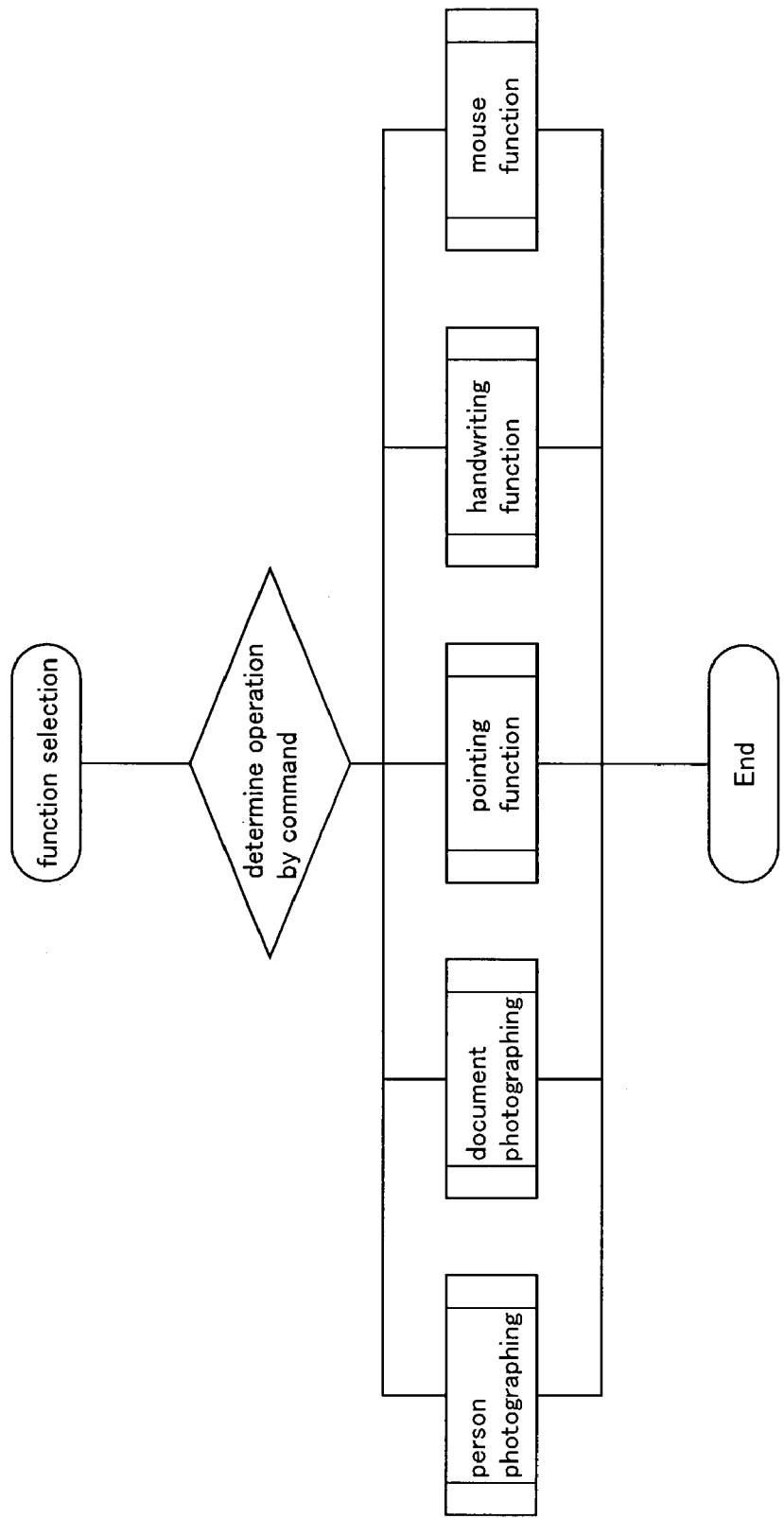
FIG. 5 is a flow chart showing a respective function of the system in the first embodiment according to the present invention.

Next, operation arrangement of the presentation system by the control section 140 is described below. As shown in FIG. 5, in the function of the system, a command indicated by the function switching button provided at the pointer 170 is input into the control section 140. According to the command, "person photographing" and "document photographing" for inputting into a photographed image by the camera 152, "point function" for pointing a photographed image by camera 152 or an image by the personal computer 130, "handwriting function" and "mouse function" for performing a mouse operation on an image of the personal computer 130 is performed.

Figure 6:
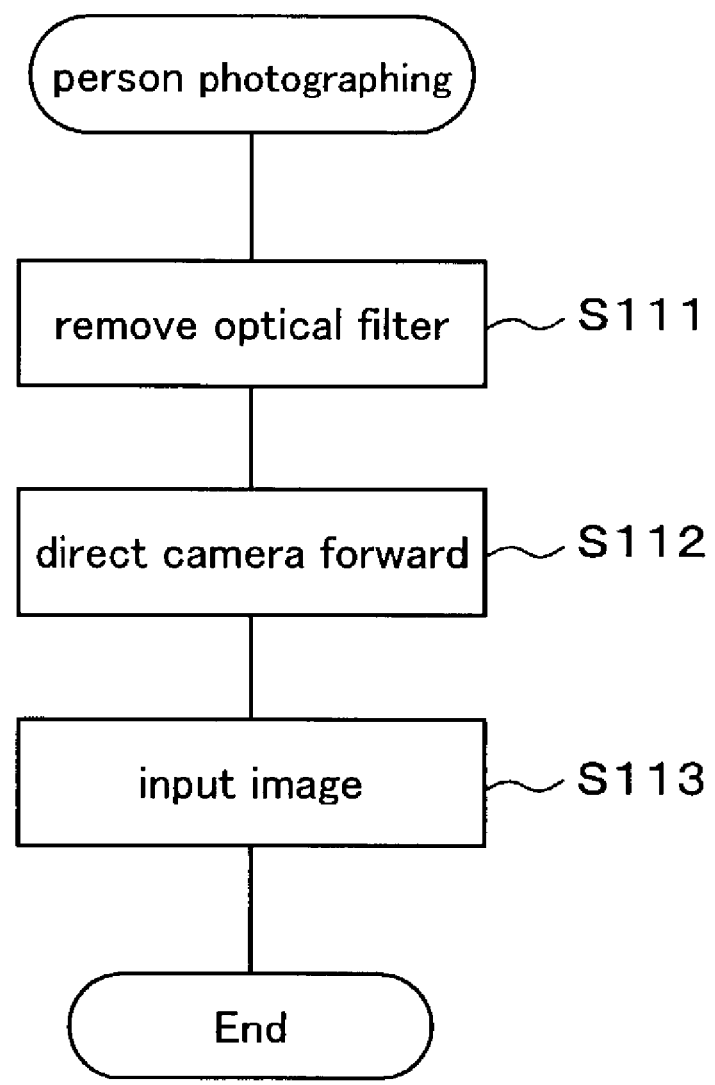
FIG. 6 is a flow chart showing an operation of a person photographing in the first embodiment according to the present invention.

(1) Person Photographing (Shown in FIG. 6)

First, the presenter switches using the function switching button of the pointer 170, so that image data on the camera 152 is set to be output to the liquid crystal projector 120. Next, the presenter removes the optical filter 159 from the optical photographing path of the camera 152 (in step S111) and directs the photographing direction of the camera 152 forward (in step S112). Thus, the photographed image by the camera 152 is continuously input into the control section 140 (in step S113), and the photographed image is processed by the control section 140. The photographed image processed by the control section 140 is output to the liquid crystal projector 120, and an image based on the photographed image is projected onto the screen 110. In this case, for example, the presenter or audience is to be the target.

Figure 7:
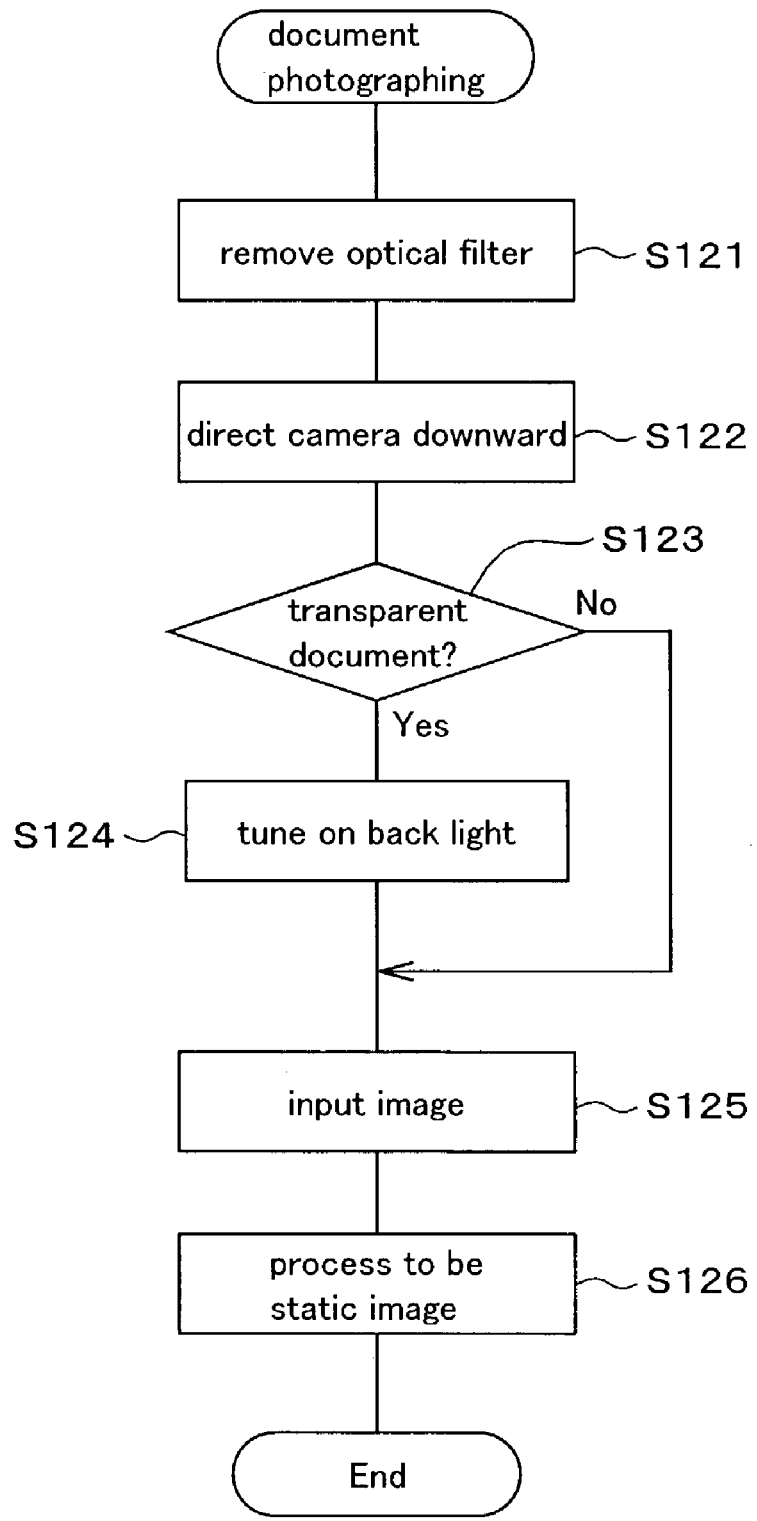
FIG. 7 is a flow chart showing an operation of material photographing in the first embodiment according to the present invention.

(2) Document Photographing (Shown in FIG. 7)

According to the material photographing, that is, the function of photographing the document S1 on the manuscript pedestal 155, it is assumed that the document S1 is a normal document (reflecting document) or a transparent document such as an over head projector (OHP) sheet. First, the presenter switches by the function switching button of the pointer 170, so that image data on the camera 152 is set to output to the liquid crystal projector 120. The presenter removes the optical filter 159 from the optical photographing path of the camera 152 (in step S121) and directs the photographing direction of the camera 152 downward (in step S122). The next operation depends on whether or not the document S1 is a light-transmitting document (in step S123). If the document S1 is a light-transmitting document, the presenter turns on the back light of the manuscript pedestal 155 (in step S124), and the image of the document S1 is input into the control section 140 (in step S125). If the document S1 is not a light-transmitting document, a step S125 is selected, that is, the image of the document S1 is input into the control section 140 (in step S126). Next, the input image is processed to be as a static image by the control section 140. The static image data is output to the liquid crystal projector 120, and the image based on the static image data is projected onto the screen 110.

Figure 8:
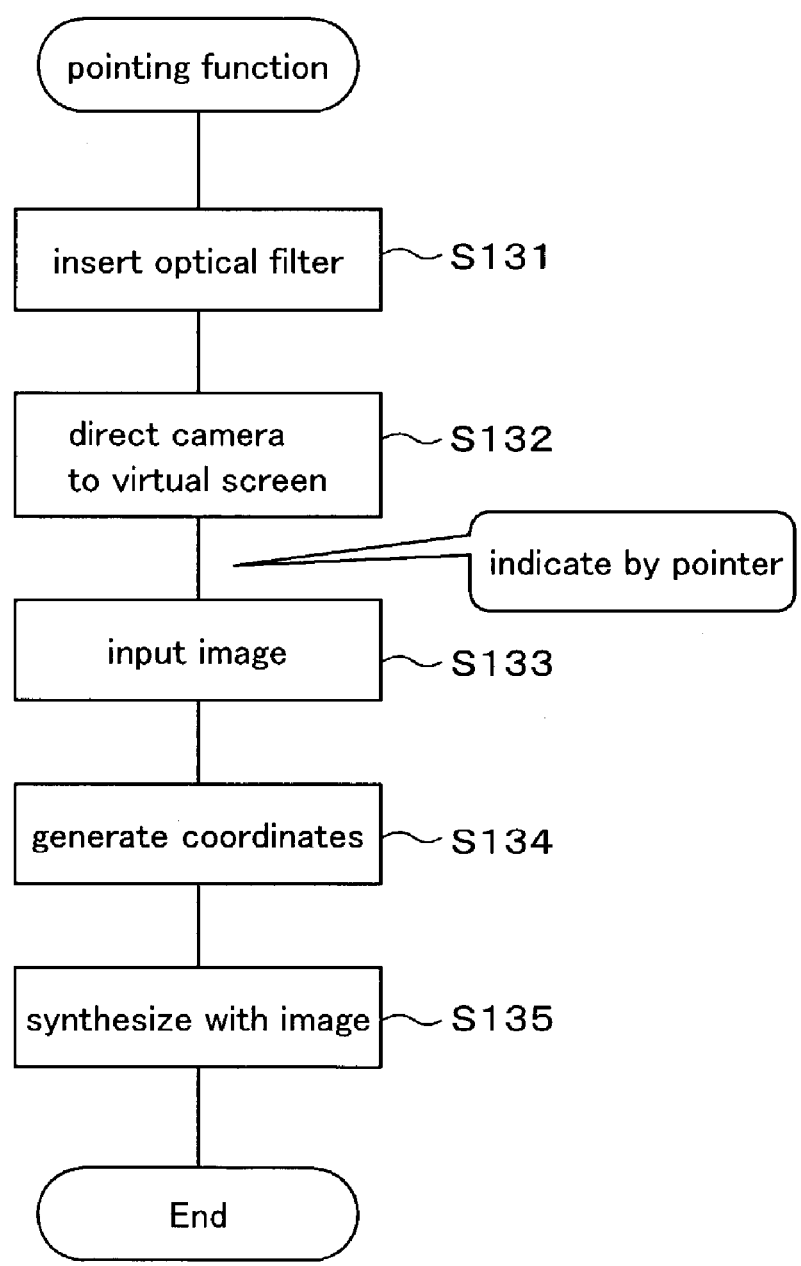
FIG. 8 is a flow chart showing an operation of a point function in the first embodiment according to the present invention.

(3) Point Function (Shown in FIG. 8)

The presenter switches by the function switching button of the pointer 170, so that image data on the personal computer 130 is output to the liquid crystal projector 120. The presenter places the optical filter 159 in the optical photographing path of the camera 152 (in step S131) and directs the photographing direction of the camera 152 toward the display 156 on which the virtual screen 111 is generated (in step S132). Next, the presenter switches the pointer 170 to the pointing function, depresses this pointer 170 on the surface of the display 156, and indicates a point of the display 156 by the emitting section 171 which emits light. The emitting section 171 is photographed by the camera 152, and the photographed image is input into the control section 140 (in step S133). Next, the control section 140 calculates coordinates of the emitting section 171 on the coordinates of the virtual screen 111 and generates the coordinates of the emitting section 171 (in step S1134), and synthesizes a point image with the image of the personal computer 130 (in step S135). Thus, the point image is projected onto the point of the screen 110 corresponding to the position of the emitting section 171 on the display 156.

Figure 9:
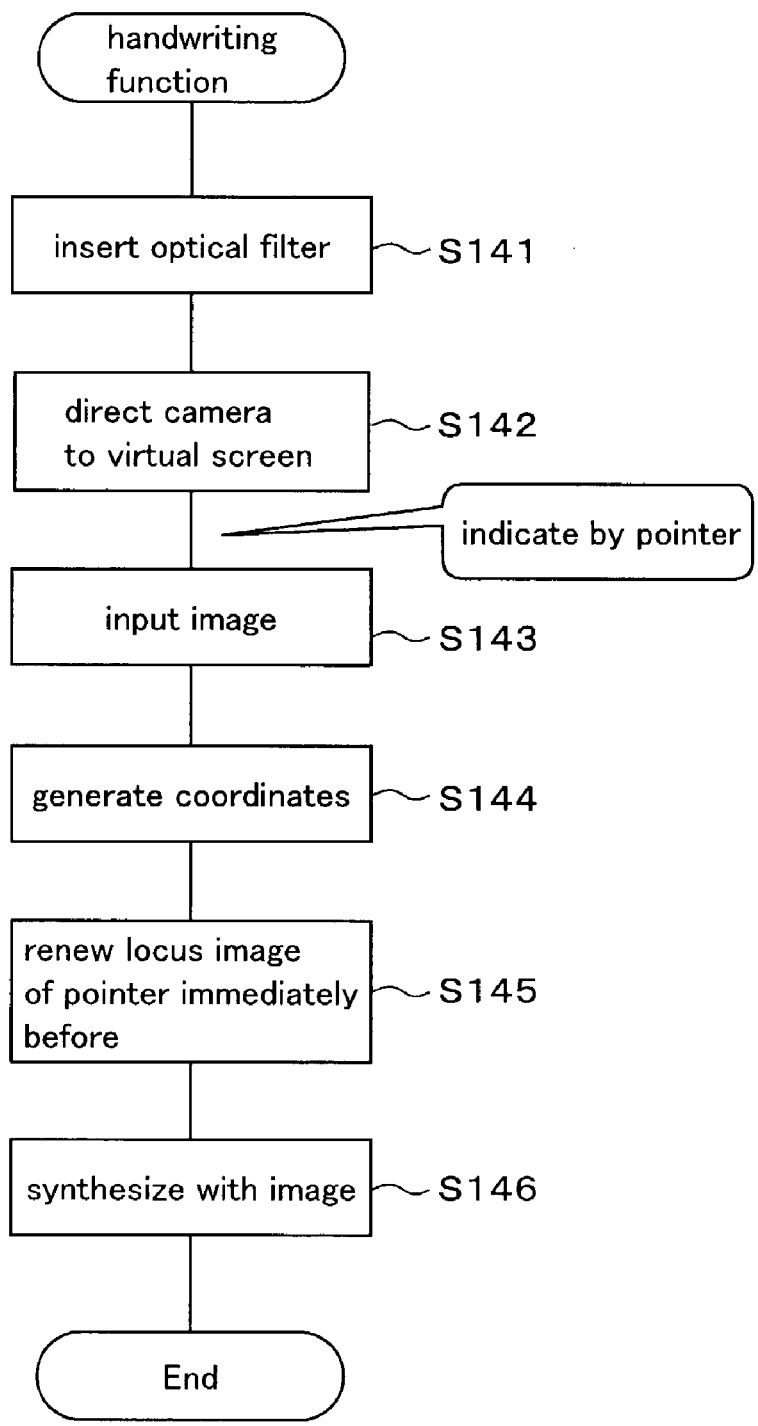
FIG. 9 is a flow chart showing an operation of a hand writing function in the first embodiment according to the present invention.

(4) Handwriting Function (Shown in FIG. 9)

First, the presenter switches by the function switching button of the pointer 170, so that image data on the personal computer 130 is output to the liquid crystal projector 120. The presenter places the optical filter 159 in the optical photographing path of the camera 152 (in step S141) and directs the photographing direction of the camera 152 toward the display 156 on which the virtual screen 111 is generated (in step S142). Next, the presenter switches the pointer 170 to the handwriting function, depresses this pointer 170 on the surface of the display 156, and, while the emitting section 171 emits light, draws characters or the like by moving the emitting section 17 on the display 156. The emitting section 171 is photographed by the camera 152, and the photographed image is input into the control section 140 (in step S143). Next, the control section 140 calculates coordinates of the emitting section 171 on the coordinates of the virtual screen 111, generates the coordinates of the emitting section 171 (in step S144), renews the point image just before (in step S145), and synthesizes the point image with the image of the personal computer 130 (in step S146). Hereafter, the operations of photographing the emitting section 171 to synthesizing the point image are repeated. Thus, the point image is projected onto the point of the screen 110 corresponding to the position of the emitting section 171 on the display 156, and the image is projected onto the screen 110 as characters or the like.

Figure 10:
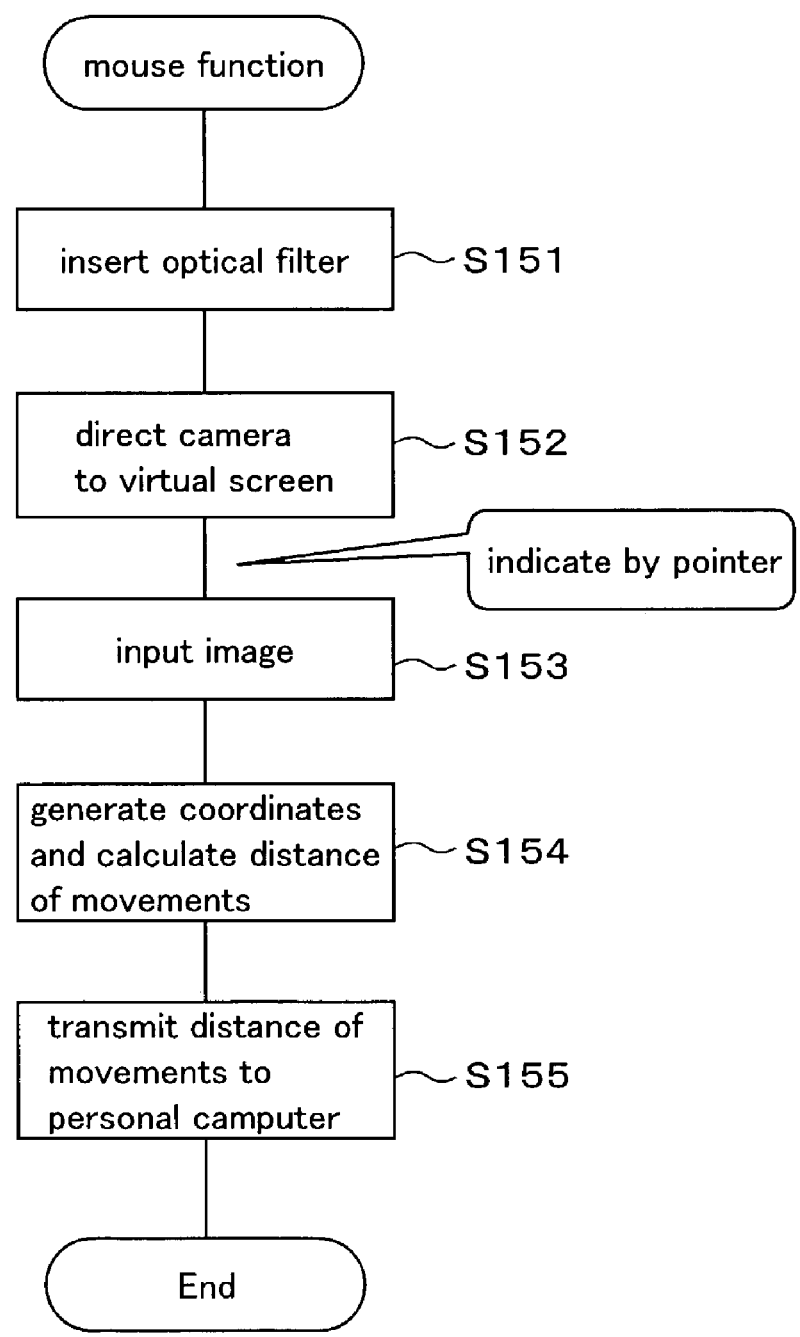
FIG. 10 is a flow chart showing an operation of a mouse function in the first embodiment according to the present invention.

(5) Mouse Function (shown in FIG. 10)

The presenter switches using the function switching button of the pointer 170, so that image data on the personal computer 130 is output to the liquid crystal projector 120. The presenter positions the optical filter 159 in the optical photographing path of the camera 152 (in step S151) and directs the photographing direction of the camera 152 toward the display 156 on which the virtual screen 111 is generated (in step S152). Next, the presenter switches the pointer 170 to the mouse function, depresses this pointer 170 on the surface of the display 156, and, while the emitting section 171 emits light, operates a mouse operation. The emitting section 171 is photographed by the camera 152, and the photographed image is continuously input into the control section 140 (in step S153). Next, the control section 140 generates coordinates of the emitting section 171 which moves on the coordinates of the virtual screen 111, calculates the distance of movements of the emitting section 171, based on the coordinates of the emitting section 171 (in step S154), and transmits the distance to the personal computer 130 as mouse data (in step S155). The mouse operation of the personal computer 130 is thereby performed.

According to the presentation system in the above-described embodiment, the pointing operation is performed by moving the emitting section 171 of the pointer 170 on the display 156 on which the virtual screen 111 is generated, and the emitting section 171 is displayed as the point image on the screen 110. The emitting section 171 is indicated directly on the display 156, and the display 156 and the virtual screen 111 correspond to each other. Thus, the pointing operation can be performed to have a sense of directly indicating. In addition, shaking can be reliably suppressed.

In addition, the virtual screen can be generated on the area of the manuscript pedestal 155 on which the manuscript pedestal 155 is placed, in the same manner as described above. In this case, the point function or the handwriting function can be thereby performed for the photographed image, even if the image projected onto the screen 110 is the photographed image of a document.

Figure 11:
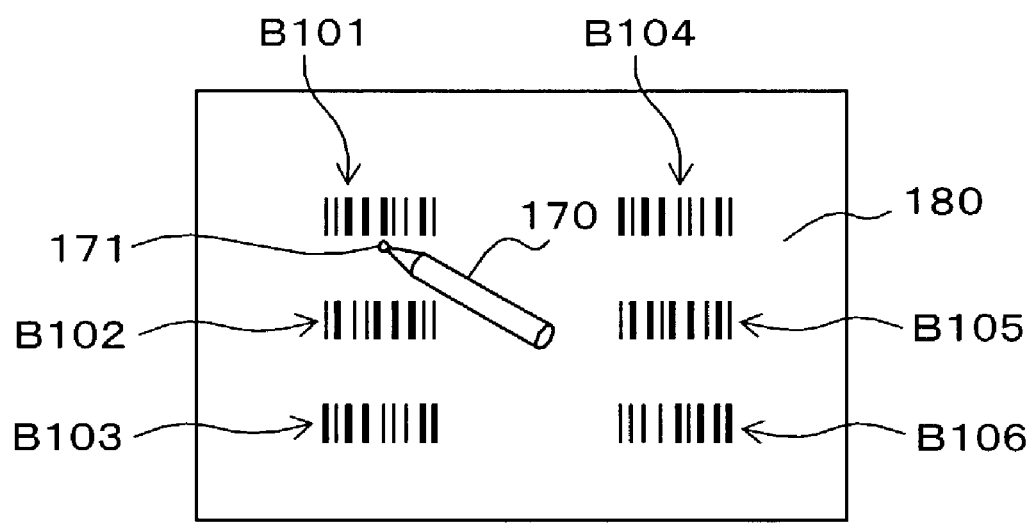
FIG. 11 is a schematic diagram of a bar code sheet storing a bar code indicated by the pointer in the first embodiment according to the present invention.

In addition, the presentation system according to the above-described embodiment can be equipped with a bar code outputting function such that a bar code displayed on the display 156 is indicated by the pointer 170, and an image related with data characteristic information which the bar code has is displayed. The bar code outputting function is described below. In this case, the photographed image by the camera 152 is displayed on the display 156 by switching from the image of the personal computer 130. In addition, the control section 140 has a memory section, and data characteristic information of a plurality of bar codes, stored by printing or placing a seal of a bar code sheet and a plurality of images related with these bar codes are registered in the memory section. As shown in FIG. 11, these bar codes are composed of a bar code B101, and a bar code B102, a bar code B103.

The arrangement of the operation of the bar code outputting function is described below. First, a bar code sheet 180 on the manuscript pedestal 155 is photographed by the camera 152 in the above manner of "material photographing". The photographed image is processed to be a static image by the control section 140, is output to the liquid crystal projector 120, is projected onto the screen 110, and is displayed on the display 156.

Figure 12:
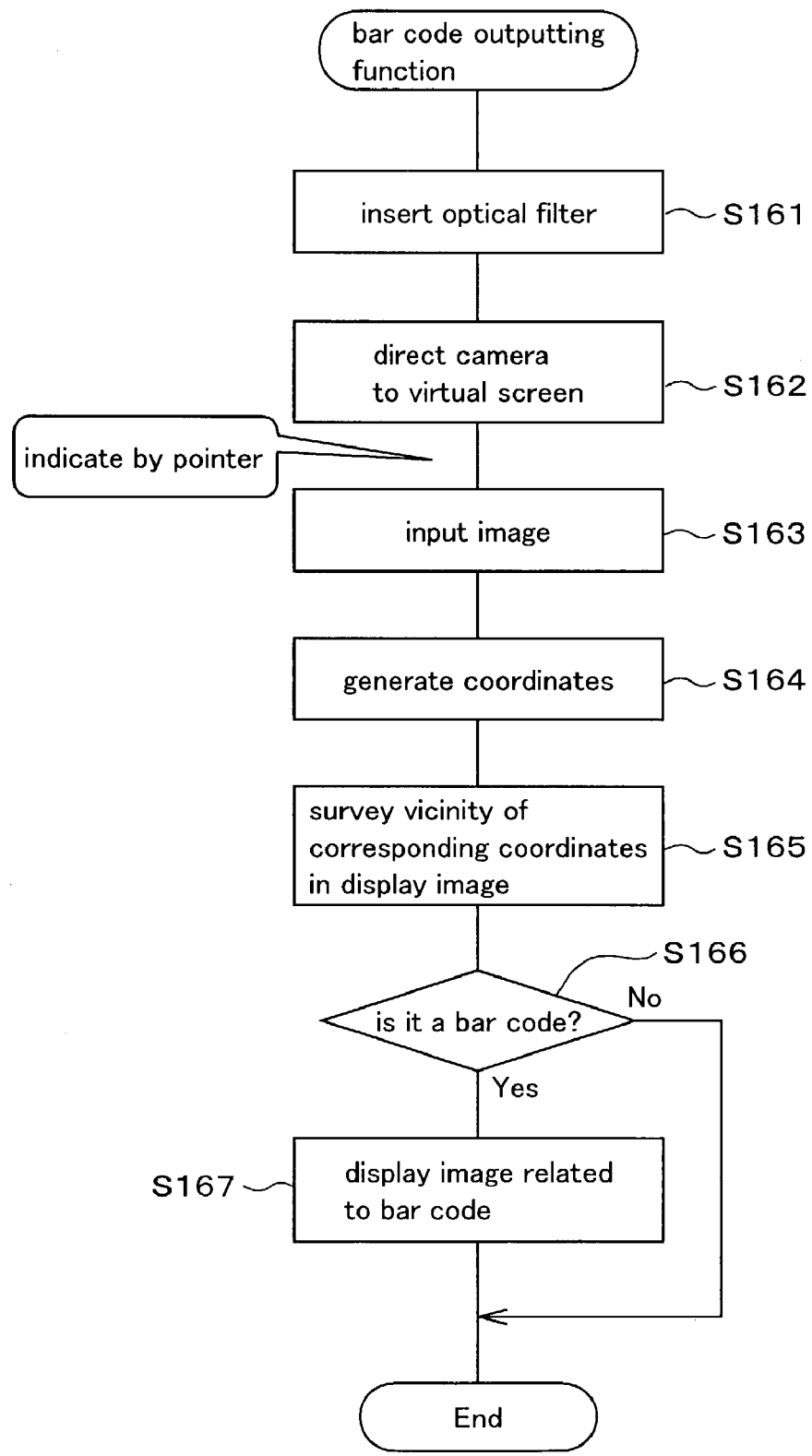
FIG. 12 is a flow chart showing an operation of a bar code outputting in the first embodiment according to the present invention.

Next, as shown in FIG. 12, the presenter places the optical filter 159 in the optical photographing path of the camera 152 (in step S161) and directs the photographing direction of the camera 152 toward the display 156 on which the virtual screen 111 is generated (in step S162). The presenter presses this pointer 170 switched to the pointing function, on one of the barcodes displayed on the display 156, which is related to the image required to be displayed (the bar code B101 in this case). The indication point of the bar code is, for example, at approximately the center of the bar code.

The emitting section 171 is photographed by the camera 152, and the photographed image is input into the control section 140 (in step S163). Next, the control section 140 calculates coordinates of the emitting section 171 on the coordinates of the virtual screen 111 and generates the coordinates of the emitting section 171 (in step S1164). The control section 140 surveys the vicinity of the coordinates corresponding to the coordinates of the emitting section 171 in the displayed image (the image of the bar code sheet 180) (in step S165), and decides whether the displayed image is the registered image of the bar code (in step S166). For example, in determining the bar code, the control section 140 surveys the coordinates of the emitting section 171 in the negative (left) and positive (right) directions of the X coordinate and converts the code of the bar code to alphanumeric characters, based on the contrast of the image, and decides on the data characteristic information based thereon. If the indicated bar code is a registered one, the image related to the data characteristic information of the bar code is output to the liquid crystal projector 120 or display 156 (in step S167). Thus, the image related to the data characteristic information of the bar code is projected onto the screen 110 and is displayed on the display 156.

Instead of the above-described arrangement, for example, as shown in FIG. 13A, the bar code B110 is stored in the document S1 for the presentation and this bar code is indicated by the pointer 170 as described above, whereby the image 190 related with the characteristic information of the bar code B110 can be converted as an image, as shown in FIG. 13B, synthesized with a material image, and displayed in the material image.

In addition, if the image of personal computer 130 is set to be composed of one output to the liquid crystal projector 120 and the display 156, and the bar code is displayed in the image, a required image can be displayed by the personal computer 130 by indicating the bar code in the same manner. If the image of the personal computer 130 is output, it is possible to register page information of advancing or returning by a page as data characteristic of the bar code and have the command executing function of advancing/returning by a page by indicating the bar code.

Furthermore, data output by indicating the bar code may be voice data rather than an image data. In this case, the voice data is input into the control section 140, and data characteristic information of the bar code is related to the voice data and is registered.

In the above-described embodiment, the bar code provided in the bar code sheet is read by the control section 140 via the camera 152, and it is thereby possible to output required data such as that of an image or a voice.

The information form for storing the data characteristic information can be a bar code (two-dimensional bar code), instead of the one-dimensional bar code of the above-described embodiment. In addition, an information form other than the bar code is, for example, characters and marks. In addition, the data characteristic information is set to be a command executing function and, for example, it is possible to execute a program composed of, for example, information of a series of operations defined (for example, a program for, for example, outputting a plurality of images in any turn).

In the above-described embodiment, as shown in FIG. 2A, the display 156 is set to incline behind the document S1 on the manuscript pedestal 155. Instead of that, as shown in FIG. 14, the display 156 may be horizontally set to be with reference to the manuscript pedestal 155, whereby the aforementioned correction is not needed when the virtual screen is generated. In this case, the manner of generating the virtual screen 111 corresponding to the display 156 is described below.

A. Setting Emitting Points of Infrared Light at more than Two Orthogonal Points on a Display In the above-described embodiment, the emitting points 156a are set at four corner points of the display 156. Instead of this, the light emitting points 156a are provided at three corner points of the display 156, whereby it is possible to correspond to the display 156 which is set inclined. In addition, the emitting points 156a of infrared light may be set at two orthogonal points on the display 156, the images of these emitting points 156a are input, and are used to generate a rectangular virtual screen based on the image.

B. Indicating Two Orthogonal Points of the Display by the Emitting Section of the Pointer and Set the Reference Points The state in which two orthogonal points are indicated by the emitting section 171 of the pointer 170 one by one is photographed by the camera 152, the coordinates of the reference points are set, and the coordinates of the rectangular virtual screen are generated, based on the diagonal line which is connecting these reference points.

C. Setting the Virtual Screen Beforehand to be Fixed

If the camera 152 and the display 156 are composed to make a set, the coordinates of the virtual screen are stored in the control section 140 beforehand 140 by the methods such as above-described B.

D. Displaying the Reference Points at more than Two Orthogonal Points of the Display For example, the reference points are displayed at the four corner points in the initial picture of the personal computer. The state in which the emitting section 171 of the pointer 170 emits at these reference points is photographed by the camera 152, is input as an image, and the coordinates of the rectangular virtual screen are generated, based on the image.

In addition, the point image of the embodiment can be displayed in a shape ranging from not only a normal point but also as a circle, an arrow, a line, or a hand.

(2) Second Embodiment

Figure 15:
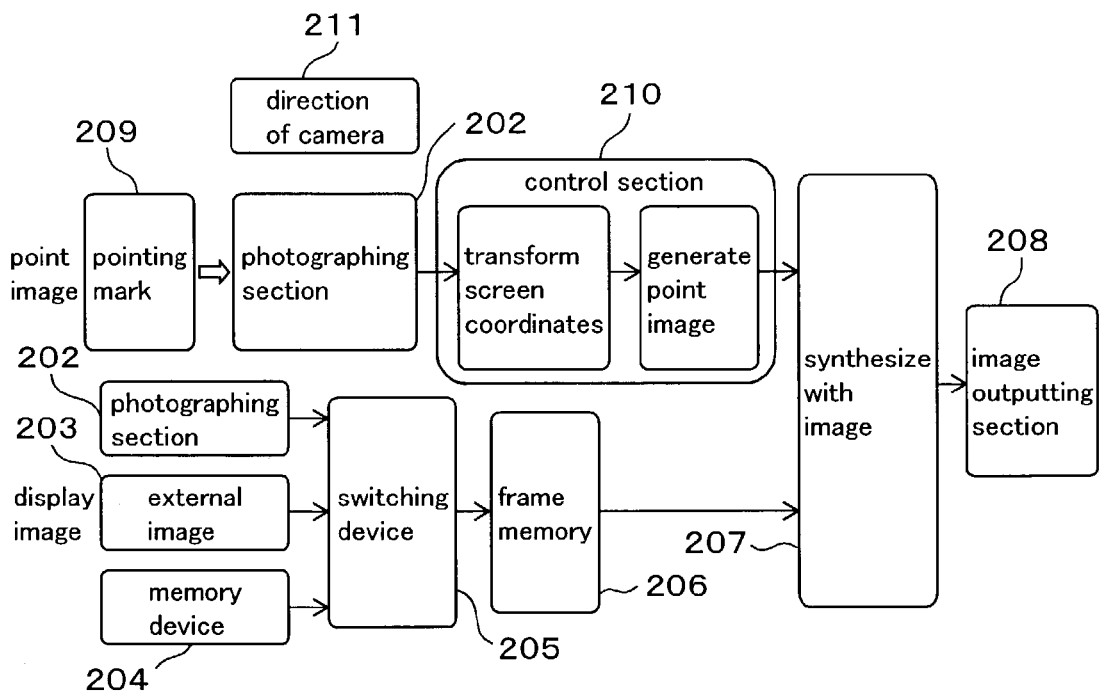
FIG. 15 is a block diagram showing a configuration and a function of a presentation system in the second embodiment according to the present invention.
Figure 16:
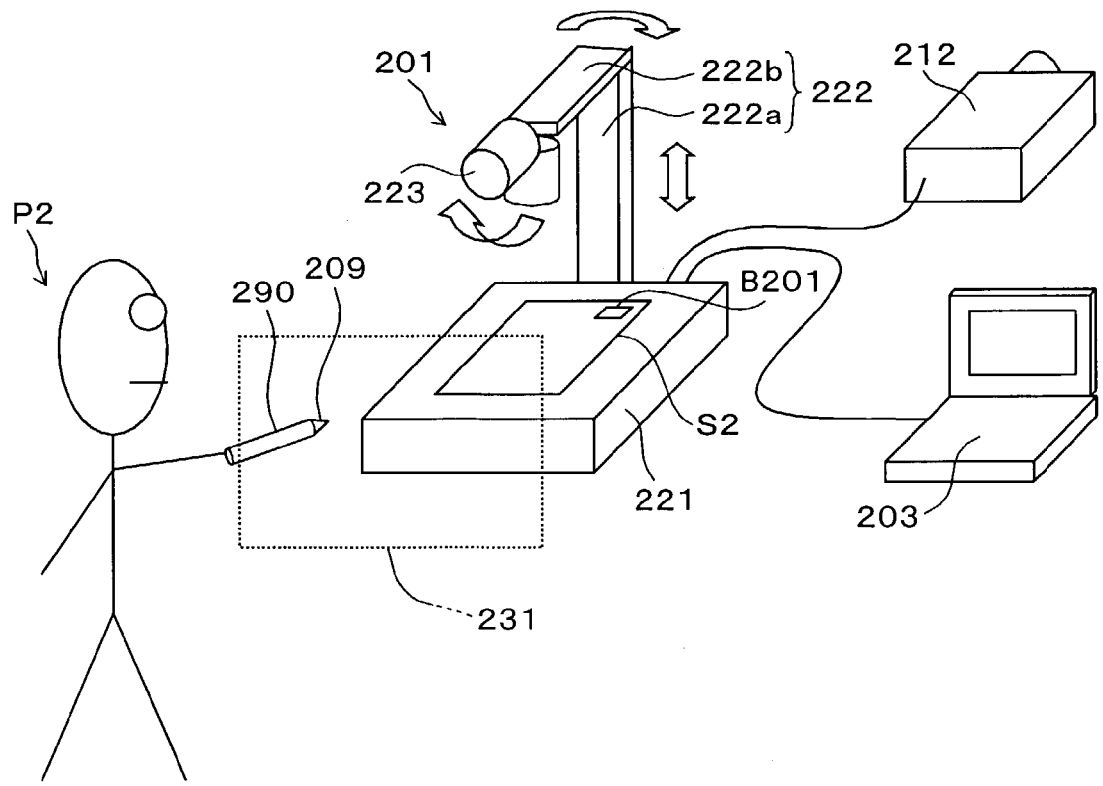
FIG. 16 is a perspective view showing a concrete image of the configuration of the system in the second embodiment according to the present invention.

FIG. 15 is a diagram showing a configuration and a function of a presentation system in a second embodiment according to the present invention. FIG. 16 shows the concrete image of the system including a material presenting device 201 in the second embodiment according to the present invention.

(1) Schema of the System

The configuration and the function of the presentation system are described below, with reference to FIG. 15.

In the system, image data related to three kinds of images, that is, an image photographed by a photographing section 202, an external image generated by a personal computer, and an image stored by a memory device 204 are switched to one of them by a switching device 205, and stored in a frame memory 206. The image data is input into an image outputting section 208 through an image synthesizing section 207, and is input into an image displaying device such as a screen and a display, whereby an image corresponding to the image data is displayed on the image displaying device.

In addition, in the system, a presenter making a presentation performs a pointing operation by operating a pointing mark 209. The pointing mark 209 is photographed by the photographing section 202, and the photographed image is input into a control section. In addition, a signal of a photographing direction sensor 211, which senses a photographing direction of a camera 223 described below is input into the control section 210. The control section 210 recognizes the photographing direction, calculates the position of the pointing mark 209, based on the recognition, transforms the position into screen coordinates of the image displaying device, and generates a point image. The generated point image is input into the image synthesizing section 207, and the image synthesizing section 207 synthesizes the point image with the image input by the frame memory 206. Thus, the image made by synthesizing the point image with the image formed by the photographing section 202, the personal computer 203, or memory device 204 is displayed on the image displaying device.

(2) Concrete Configuration of the System

The concrete configuration of the presentation system is described below with reference to FIG. 15 and FIG. 16.

In FIG. 16, reference symbol P2 denotes a presenter, and 212 denotes a liquid crystal projector. In addition, the personal computer 203 is shown in FIG. 16. The presenter P2 holds a pen 290 with the hand. The pen 290 is equipped with a light emitting object as the pointing mark 209 at the tip end. The light emitting object is composed of, for example, a light emitting diode (LED) which emits light by turning on a switch. The pointing operation is performed by the pointing mark 209, emitting light, of the pen 290 in the presentation. This pen 290 is used when setting a virtual screen 231 described below.

The material presenting device 201 comprises an material mounting pedestal 221 on which a material S2 such as a document is mounted. The camera 223 is supported by the material mounting pedestal 221 via an arm 222. The camera 223 is composed of the photographing section 202 in FIG. 15.

The arm 222 has an inverted L-shape composed of a vertical portion 222a extending vertically and a horizontal portion 222b at the upper end of the vertical portion 222a. The horizontal portion 222b extends forward of a presenter (not shown). The vertical portion 222a is extendible, and the horizontal portion 222b is rotatable with respect to the vertical portion 222a. The extension and retraction of the vertical portion 222a and the rotating of the horizontal portion 222b are performed by hand, and can be fixed at an arbitrary position. The horizontal portion 222b is generally fixed to extend forward so that the material S2 on the material mounting pedestal 221 can be photographed.

The camera 223 is provided at the leading end of horizontal portion 151b of the arm 151 via a pedestal to reciprocate so that the photographing direction can be directed downward and forward within a range of an angle of about 90°. The photographing direction is switched to a downward direction for photographing the material S2 which is mounted on the material mounting pedestal 221 or to a forward direction by hand or automatically. The photographing direction (downward direction or forward direction) is sensed by a photographing direction sensor as shown in FIG. 15. The camera 223 has a zoom function and an auto-focus function.

The switching device 205, the frame memory 206, the image synthesizing section 207, the image outputting section 208 and a control section 210 shown in FIG. 15 is provided in the material mounting pedestal 221. In addition, the image data is input from the image outputting section 208 into the liquid crystal projector 212, and the image based on the image data is projected onto the screen.

(3) Operation of the Presentation System

Figure 18:
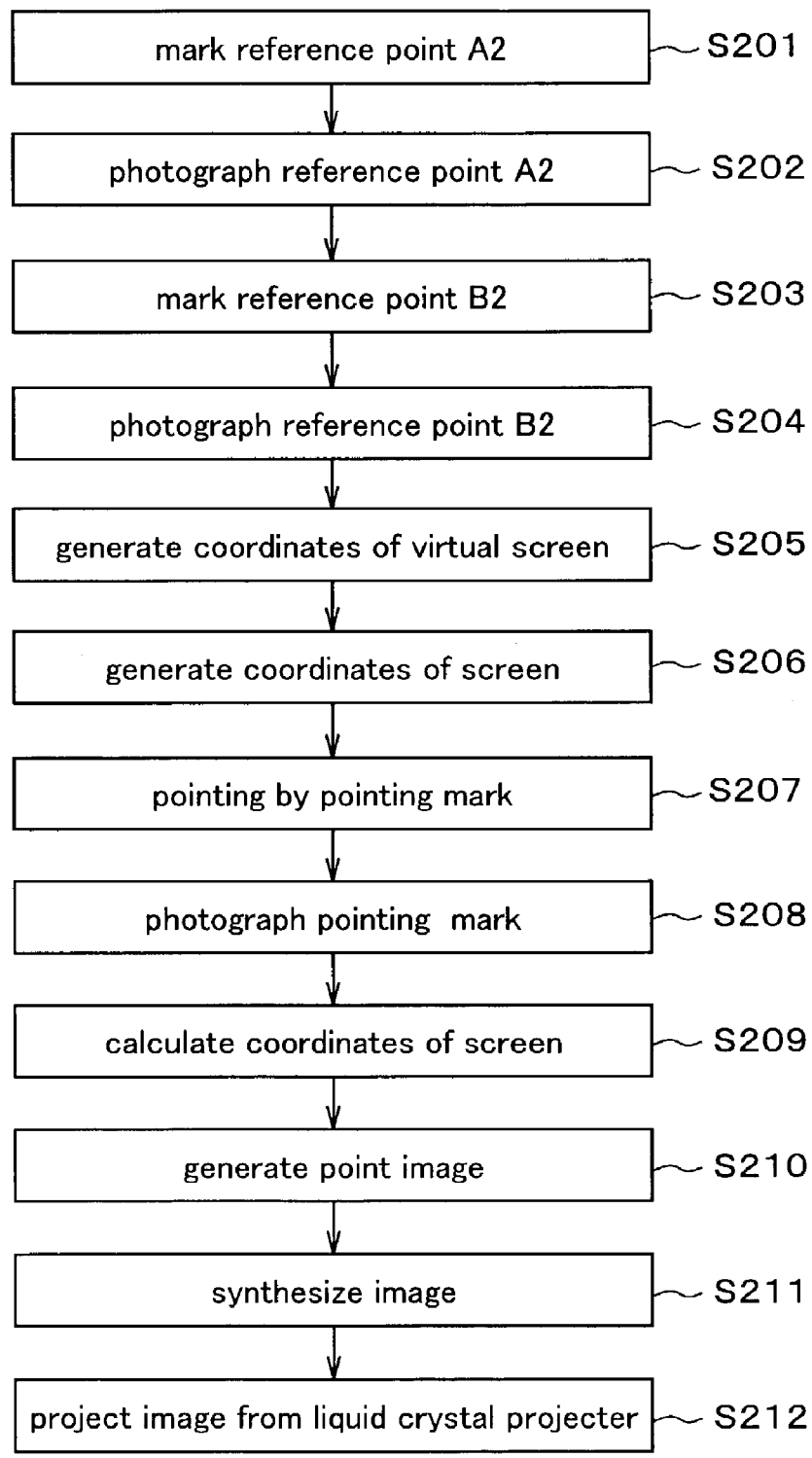
FIG. 18 is a flow chart showing a process of setting a virtual screen to a process of a pointing operation in the second embodiment according to the present invention.

The operation of the presentation system is described below. It should be noted that FIG. 18 shows the operation of from A to C.

A: Setting of Virtual Screen

Figure 17:
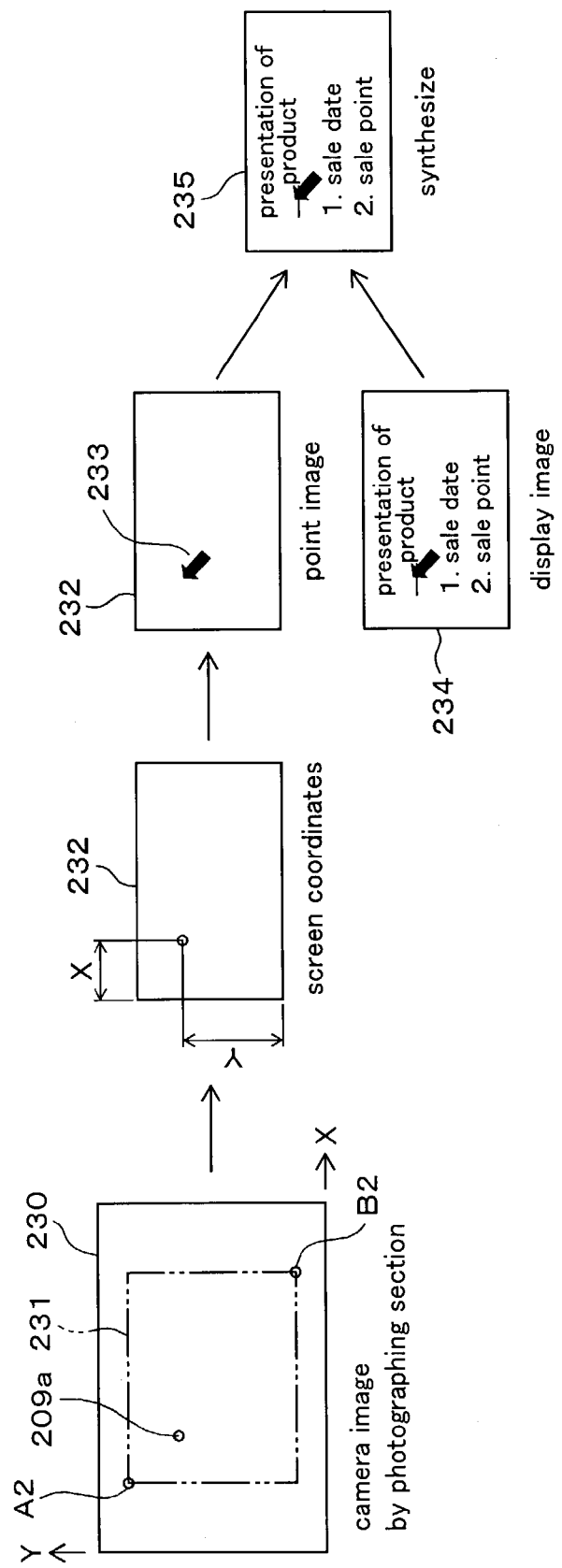
FIG. 17 is a diagram showing the image of a process of setting a virtual screen to a process of a pointing operation in the second embodiment according to the present invention.

The virtual screen is set within the angle of field according to the photographing direction of the camera 223. In this case, the photographing direction is arbitrary. The concept and the setting method of the virtual screen is described below. In FIG. 17, reference symbol 230 denotes a photographing range of camera 223 of the photographing section 202, that is, the angle of field. The rectangular virtual screen 231 is set within this angle of field. The virtual screen is a two dimensional rectangular space which has an X-axis (a horizontal axis) and a Y-axis (a vertical axis). The image of the pointing mark 209 is read as a pointing mark data on the image data by the camera 223.

The virtual screen 231 can be set as occasion demands and the order of setting the virtual screen 231 is described below with reference to FIG. 18. First, while the camera 223 is set to perform wide-angle photographing, one of two orthogonal positions of the virtual screen 231 emits light, and the light emitting position is marked as the reference point A2 (in step S201). The reference point A2 is photographed by the camera 223 (in step S202), and the position of the reference point A2 is input into the control section 210. Next, the pointing mark is turned off temporarily, the pointing mark 209 emits light at the position which is a corner point orthogonal to the reference point A2, and the light emitting position is marked as the reference point B2 (in step S203). The reference point B2 is photographed by the camera 223 (in step S204), and the position of the reference point B2 is input into the control section 210. Thereafter, the control section 210 generates the virtual screen 231, based on the diagonal line which connects the two fixed points A2 and B2 (in step S205). The fixed virtual screen 231 is set within the angle of field of the camera 223.

Instead of the above manner, for example, the virtual screen 231 can be set to use a light emitting object provided on the material mounting pedestal 221 as the reference point. In addition, the virtual screen 231 is set to be fixed within the angle of field of the camera 223 beforehand.

B: Generating of Screen Coordinates

Next to the step S205 in FIG. 18, the screen coordinates are generated (in step S206). The screen coordinates are obtained by calculating the X direction and the Y direction, based on the relative positions in the X direction and Y direction, such as corresponding to a ratio of the number of pixels of the X direction to the one of the Y direction of the display image (the image based on the image data input into the frame memory 206) displayed on the screen. In FIG. 17, reference symbol 232 gives one example of the above. The screen coordinates 232 are stored by the control section 210.

C: Pointing Operation in the Presentation

The processes of the pointing operation in the presentation are after the step S207 in FIG. 18. That is, the pointing operation is performed by moving the pointing mark which is emitted arbitrarily on the virtual screen 231 (in step S207). The pointing mark 209 is photographed by the camera 223 (in step S208), the photographed image of the pointing mark 209 is input into the control section 210, and the control section 210 sequentially calculates the position of the pointing mark, based on the recognition of the photographing direction of the camera 223 and transforms the position to the screen coordinates (in step S209). Next, the point image is generated on the position of the screen coordinates. In FIG. 17, reference symbol 234 denotes the display image and, in this case, the display image is an arrow. On the other hand, in FIG. 17, reference symbol 234 denotes the image display, and the image display 234 and the point image 233 are input into the image synthesizing section 207. Then the image synthesizing section 207 synthesizes the point image 233 with the display image 234 (in step S211) and the synthesized image 235 is projected from the liquid crystal projector 212 onto the screen (in step S212).

D: Position for Performing a Pointing Operation

Figure 19:
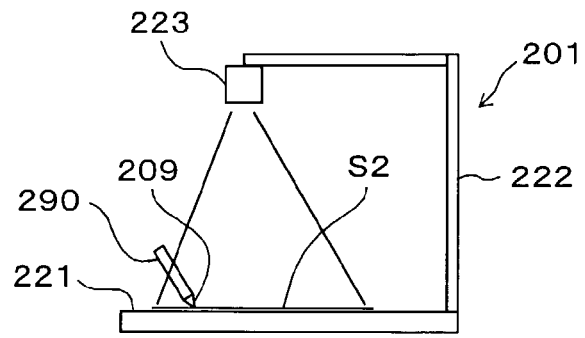
FIG. 19 is a diagram showing a state in which a presenter performs a pointing operation while photographing a material in the second embodiment according to the present invention.
Figure 20:
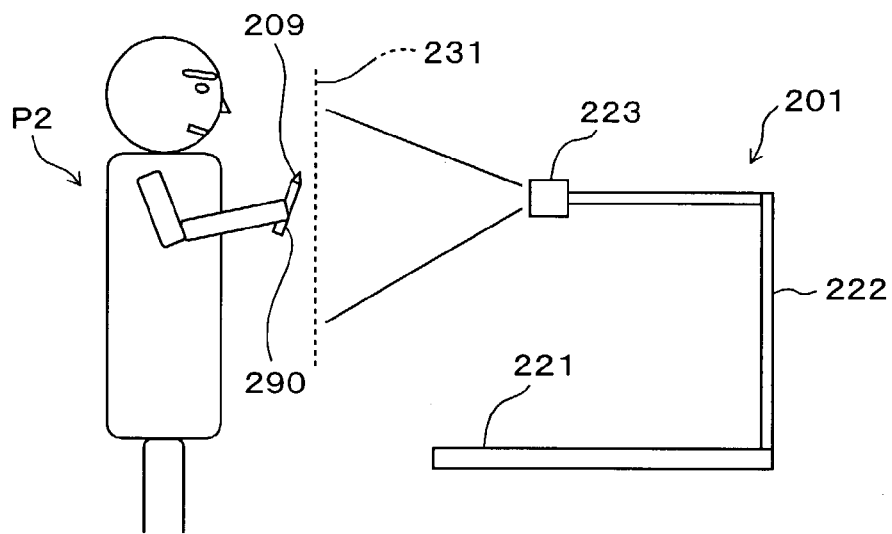
FIG. 20 is a diagram showing a state in which a presenter performs a pointing operation away from a material presenting device in the second embodiment according to the present invention.
Figure 21:
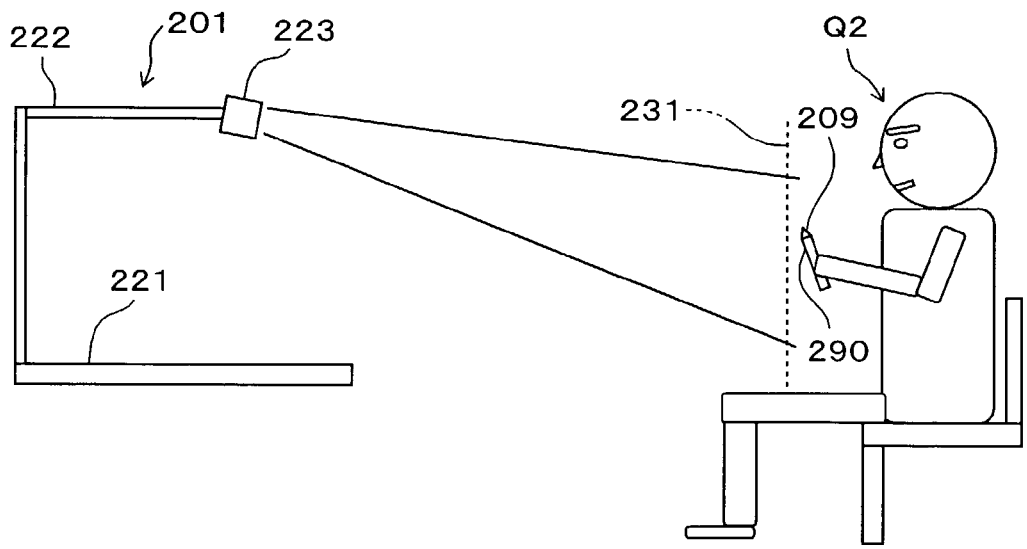
FIG. 21 is a diagram showing a state in which an audience member performs a pointing operation in the second embodiment according to the present invention.

The above-described operations from A to C are the processes to the pointing operation. These processes are executed in various situations of the presentation, depending on the position of the presenter P2, the person performing a pointing operation. Three examples are described below.

a) FIG. 19 shows the case in which the presenter P2 performs a pointing operation on the material S2 mounted on the material mounting pedestal 221 of the material presenting device 201. In this case, the camera 223, of the photographing direction is set downward, and photographs the material S2 and the virtual screen is set within the photographing range. If the image displayed on the screen is set to be composed of one by the personal computer 203 or the memory device 204, the only point image based on the photographed image of the pointing mark 209 is synthesized with the display image. In contrast, if the image displayed on the screen is set to be composed of the one of the material S2, that is, the photographed image by the camera 223, the shadow of the pointing rod or the hand of the presenter falls onto the screen as in a conventional manner. In this case, according to this embodiment, the image by the camera 223 is processed to be a static image, and if the point image is synthesized with the static image, only the point image can be synthesized.

b) FIG. 20 shows the case in which the presenter P2 performs a pointing operation away from the material presenting device 201. In this case, the virtual screen 231 is set in the space in front of or in the side of the presenter P2, and the camera 223 is set to be directed forward to photograph the pointing mark 209. The image displayed on the screen is the static one of the image by the camera 223, or the one by the personal computer 203 or the memory device 204.

c) FIG. 21 shows the case in which, while performing a pointing operation, an audience member Q2 asks the presenter P2 a question. In this case, the camera 223 is set to be directed at the audience member Q2 and the virtual screen 231 is set in the space in front of or in the side of the audience member Q2. The image displayed on the screen is the static one of the image by the camera 223, or the one by the personal computer 203 or the memory device 204.

The second embodiment according to the present invention has been described so far. According to this embodiment, the presentation system differs basically from the conventional method of directly indicating a material, and the pointing operation is performed by reflecting the movements of the pointing mark 209 in the display image while the pointing mark 209 is photographed by the photographed section 202. Thus, the problem that the pointing rod and the hand block the view of seeing an image of the material does not occur and it is thereby possible to perform a pointing operation on a specific part accurately and clearly. In addition, it is not necessary to use an external device such as a digitizer and it is possible to apply the conventional image processing technique, whereby the presentation system can be composed inexpensively and not cause the material presenting device to be larger.

Furthermore, the photographing direction of the camera 223 of the photographing section 202 can be changed arbitrarily and the virtual screen can be set according to the photographing direction, whereby the freedom of the position of the presenter P2 is improved. In addition, as described above, the audience Q2 can easily perform a pointing operation. Moreover, the photographing section 202 can photograph, for example, the state in the place and the audience in the intervals of the presentation, unrelated to the pointing operation. Thus, it is possible to make the presentation more flexible.

In addition, in particular, the pointing mark is not composed of a light emitting object such as an LED in the above embodiment. Instead of that, for example, the pointing mark may be composed of a reflecting object which has a high reflectance with respect to the background or an object which is different from the background in color. That is, the pointing mark has high visibility. Thus, it is easy to not only recognize the position of the pointing mark but also to generate the point image. This pointing mark is thereby preferable.

The pointing mark may be composed of a light emitting object which flickers. In this case, if the light emitting object is recognized, based on the flickering cycle of the flickering light emitting object, the pointing mark can be recognized more reliably. For example, if the photographing section 202 searches for the position when lit by comparing brightness data when lit with brightness data when not lit, the influence of the light of the background is reduced.

Figure 22A:
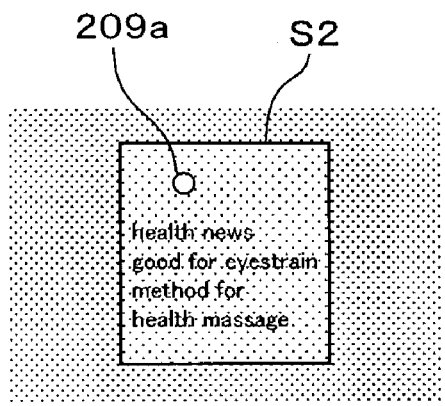
FIG. 22 is a diagram showing an image of detecting the position of a pointing mark flickering, based on the brightness data in the second embodiment according to the present invention.
Figure 22B:
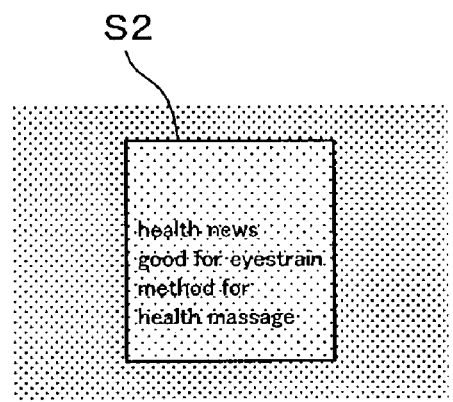
Figure 22C:
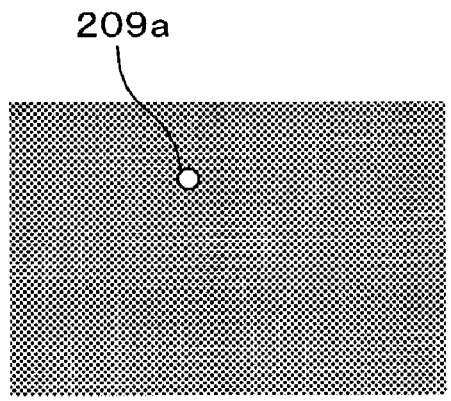

FIG. 22A shows the image of the brightness data on the state in which the pointing mark 209 emits light and the material S2 is reflected within the photographing range of the camera 223. FIG. 22B shows the image of the brightness data in the state in which the pointing mark 209 is not lit. If the brightness data when it is not lit is subtracted from the brightness data when it is lit, only the pointing mark is detected, as shown in FIG. 22C.

In this case, the photographing timing by the camera 223 is described below. A light emitting section which emits infrared light so as to synchronize with the light emitting of the flickering pointing mark is provided in the pen 290. A light receiving sensor, composed of, for example, a photodiode, which receives the infrared light of the emitting section, is provided in the material presenting device 201. With this structure, the camera 223 photographs so as to distinguish between the case in which the receiving sensor receives the infrared light and the case in which the receiving sensor does not receive that light. In addition, in contrast to that case, the light emitting section emits infrared light from the material presenting device 201 to the pen 290, and the pointing mark emits light so as to synchronize with the infrared light of the light emitting section. Even if those emitting sections emit light so as not to be synchronized, the same operation can be obtained in both the above cases.

In addition, the point image can be composed of an arbitrary one of shape ranging from not only an arrow as shown in FIG. 17 but also, for example, a dot, a circle or a line by the image processing technique. Moreover, the point image, which the pointing mark is reflected as, can be made as a continuous long line by repeatedly synthesizing so as to connect the intervals of the screen coordinates of the moving pointing mark. If this method is applied, characters can be drawn on the display image.

In addition, the presentation system according to the above-described embodiment can be equipped with a bar code outputting function such that a bar code B201, which is stored in the material S2, indicated by the pointing mark 209, and an image related with data characteristic information, which the bar code B201 has, is displayed.

Predetermined data and data characteristic information related with the predetermined data are registered in the control section 210, and the data characteristic information are stored as a bar code. When the position of the bar code B201 in the image on the screen is indicated by the pointing mark 209, the control section 210 recognizes the information form through the camera 223 and outputs the predetermined data related to the information form.

The information form for storing the data characteristic information can be a bar code (two-dimensional bar code), instead of the one-dimensional bar code of the above-described embodiment. In addition, an information form other than the bar code is, for example, characters and marks. In addition, the data characteristic information is set to be a command executing function and, for example, it is possible to execute a program composed of, for example, information of a series of operations defined (for example, a program for, for example, outputting a plurality of images in any turn). A bar code sheet may be used as the material S2. In addition, the data characteristic information may be stored in the external image which is generated by the personal computer 203 or the image stored by the memory device.

(3) Third Embodiment

Figure 23:
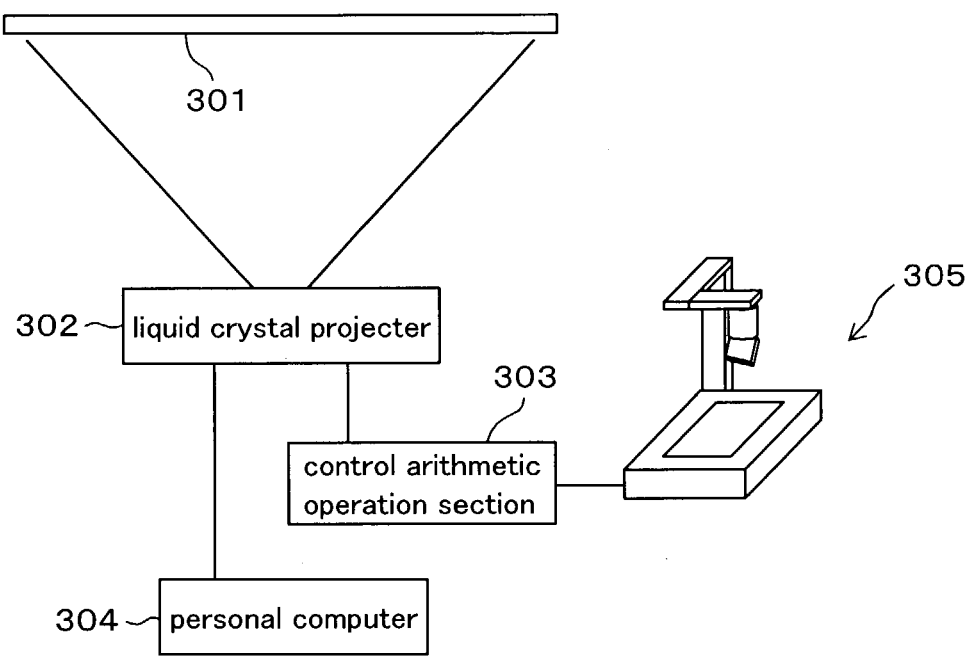
FIG. 23 is a schematic diagram of a presentation system using a material presenting device in the third embodiment according to the present invention.

FIG. 23 shows schematically the entire presentation system equipped with a material presenting device in the third embodiment according to the present invention. In FIG. 23, numeral symbol 301 denotes a screen, 302 denotes a liquid crystal projector which projects a liquid crystal image onto the screen 301, 303 denotes a control arithmetic operation section (control device), and 304 denotes a personal computer. Image data on the display of the personal computer is output to the liquid crystal projector 302, and is projected from the liquid crystal projector 302 to the screen 301.

Figure 24:
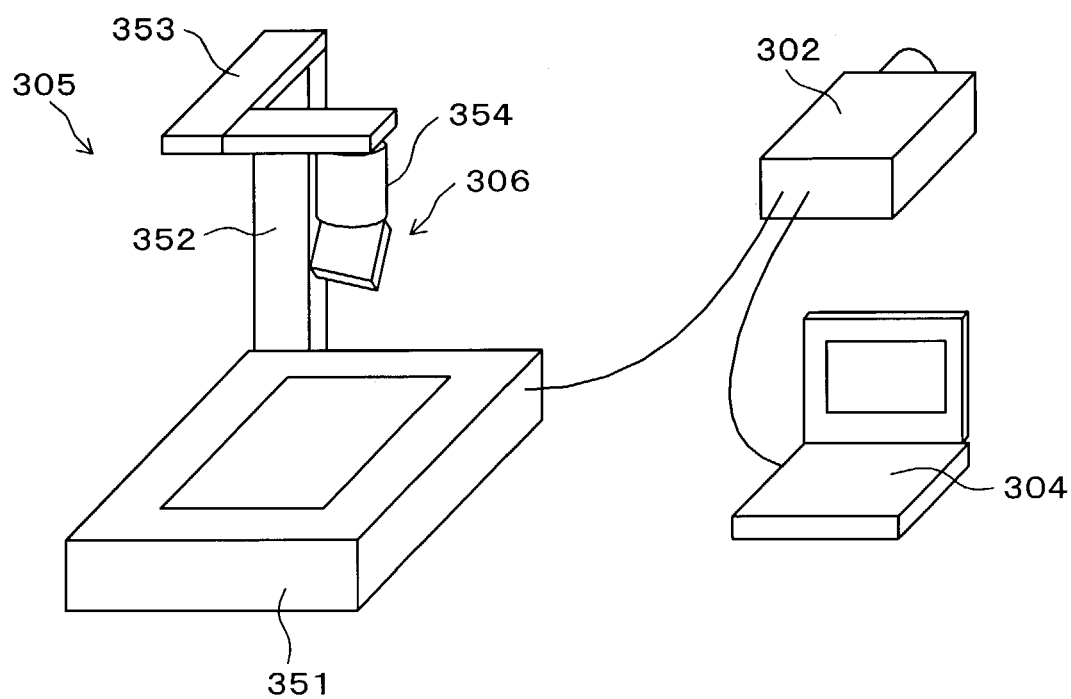
FIG. 24 is a perspective view showing the material presenting device in the third embodiment according to the present invention.

In FIG. 23, numeral symbol 305 denotes a material presenting device. In FIG. 24, this material presenting device 305 is equipped with a material mounting pedestal 351 (material mounting device) which is set to be a base of the material presenting device. The control arithmetic operation section 303 is provided in the inside of the material mounting pedestal 351 and is connected to the liquid crystal projector 302. A stand 352 is provided at the one side of the material mounting pedestal 351, and an arm 353 which extends horizontally in the shape of inverted L is provided at the upper end section of the stand 352. The leading end portion of the arm 353 is positioned at about the center of the material mounting pedestal 351, at which a camera 354 (photographing device), which is equipped with a lens and a charge coupled device (CCD), is provided. An optical path switching device 306 is provided at the camera 354.

Figure 25:
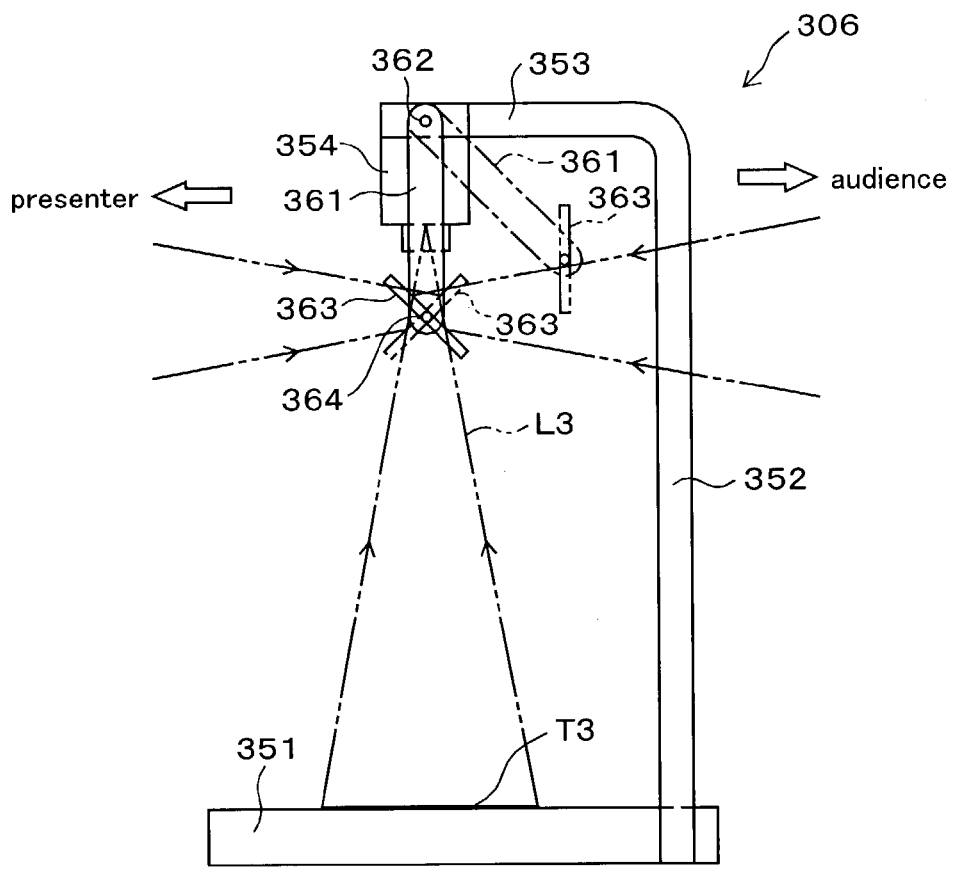
FIG. 25 is a side view showing details of the material presenting device in the third embodiment according to the present invention.

FIG. 25 and FIG. 26 show details of the optical path switching device 306. As shown in the figures, a pair of swing arms (supporting arms) 361 is supported to be rotatable by a shaft 362 at the leading end portion of the arm 353 to place the camera 354 therebetween. The center portion of a reflector 363 of which both sides is set to be reflection surfaces is rotatably supported by a shaft 364 at the lower end portion of the swing arm 361.

Figures 26A, 26B, 26C:
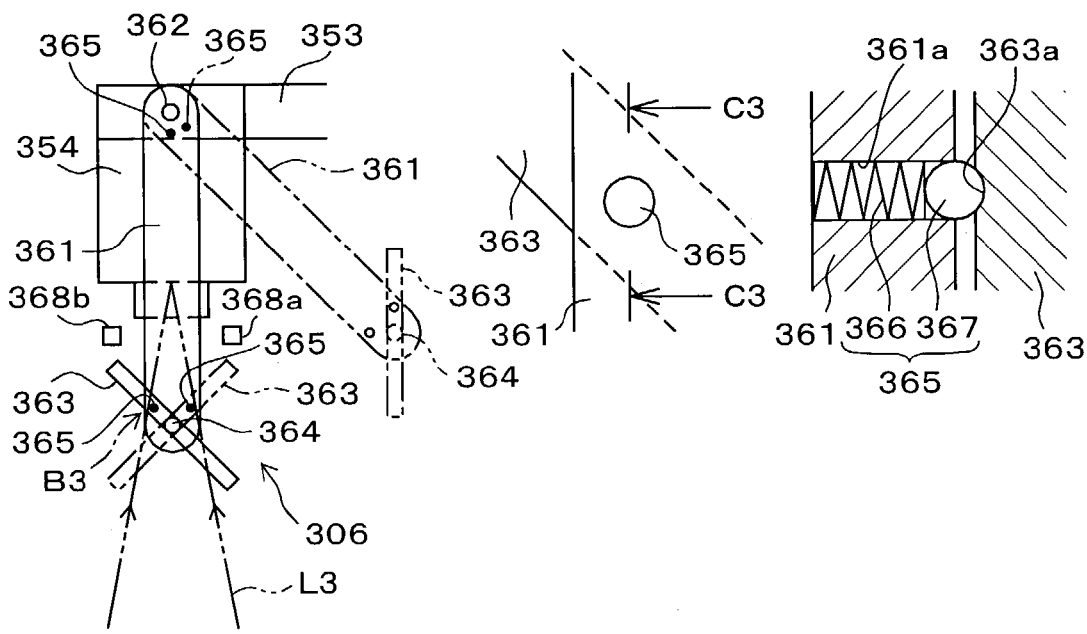
FIG. 26A is an enlarged diagram showing the important part of the material presenting device in the third embodiment according to the present invention.
FIG. 26B is an enlarged diagram showing B in FIG. 26A.
FIG. 26C is a cross section of C—C in FIG. 26B.

FIG. 26B is an enlarged drawing showing the portion B shown in FIG. 26A, and FIG. 26C is a cross section taken at Line C—C in FIG. 26B. A pair of ball plungers (holding device) 365 is provided at the lower end portion of the swing arm 361. That is, as shown in FIG. 26C, a hole 361a is formed in the swing arm 361, and a coil spring 366 is put in the hole 361a. A steel ball 367 is provided at the leading end portion of the coil spring 361a, and the leading end portion of the steel ball 367 is projected out of the hole 361a by the elastic force of the coil spring 366. The ball plunger 365 is composed of the coil spring 366 and the steel ball 367. The opening portion of the hole 361a is set to be smaller than the diameter of the steel ball 367 so that the steel ball 367 does not fall.

On the other hand, a recessed portion 363a is formed on the side portion of the reflector 363 or the holder of the reflector 363. The leading end portion of the steel ball 367 is fit into the recessed portion 363a, whereby the position of the reflector 363 is held with respect to the swing arm 361. The reflector 363 is held at two positions to be inclined at a predetermined angle with reference to the horizontal direction when the swing arm 361 is directed vertically.

FIG. 26A shows two relative positions at which the reflector 363 is held. A two dot-chain line in FIG. 26A shows the position at which the image of a presenter is reflected by the reflector 363 and enters the camera 354. On the other hand, a solid line in FIG. 26A shows the position at which the image of an audience is reflected by the reflector 363 and enters the camera 354. It is appropriate that the position of the reflector 363 be at an angle of about 30° with respect to the horizontal direction in the former case and the position of the reflector 363 be at an angle of about 45° in the latter case. The camera 354 is equipped with a pair of sensors 368a and 368b via a bracket (not shown) so that the reflector 363 is sensed at the first position or the latter position.

In addition, the above-described ball plunger 365 is provided at a base section of the swing arm 361. On the other hand, two recessed portions (not shown) which are the same as the recessed portion 363a are relatively formed at two positions of the arm 353 supporting the swing arm 361, and the leading end of the steel ball of the ball plunger 365 is fit into the recessed portion. The swing arm 361 is held by the ball plunger 365 and the recessed portions so that the reflector 363 is out of a material photographing optical path L3.

Next, the operation of the presentation system is described below. The image by the personal computer 304 or by the camera 354 is projected from the liquid crystal projector 302, the switching between the two images is operated by a command by the personal computer 304, a switch provided at the material mounting device 351, or the like. The operations in which an object photographed by the camera 354 is projected from the projector 302 onto the screen 301 are described below with reference to FIG. 27.

If the image by the camera 354 is selected, the signal of the effect is input into the control arithmetic operation section 303 (in step S301), the control arithmetic operation section 303 checks the sensing result of the sensors 368a and 368b (in step S302). If an image of a material T3 set at the material mounting pedestal 351 is projected onto the screen 301, the swing arm 361 is positioned at the position of the two dot-chain line in FIG. 26A. In this case, since neither of the sensors 368a and 368b sense the reflector 363, the control arithmetic operation section 303 proceeds to a step S303, and the image of the material T3 photographed by the camera 354 is projected from the projector 302 onto the screen 301.

Figure 28A:
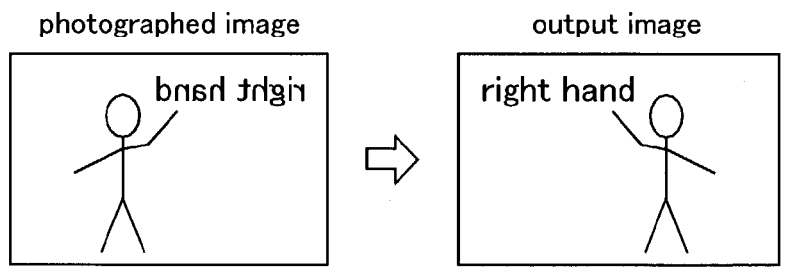
FIG. 28 is a diagram showing a photographed image and an output image in the third embodiment according to the present invention.

Next, if the camera 354 photographs the presenter or the audience, the arm 361 is positioned vertically by rotating downward. In this case, the ball plunger 365 operates and thereby holds the swing arm 361 at that position. If the camera 354 photographs the presenter, the reflector 363 is positioned at the position of the two dot-chain line in FIG. 26A. In this case, as shown in FIG. 28A, the direction of the top and bottom of the image of the presenter is corresponded with the one of the photographed image of the material T3; however, it is mirror-inverted. At this time, since the other sensor 368a senses the reflector 363, the control arithmetic operation section 303 operates the process of a step S304. In step S304, the control arithmetic operation section 303 operates an image processing of transforming the mirror image photographed by the camera 354 to a normal image. Next, in step S303, the normal image is projected from the projector 302 onto the screen 301.

Figure 28B:
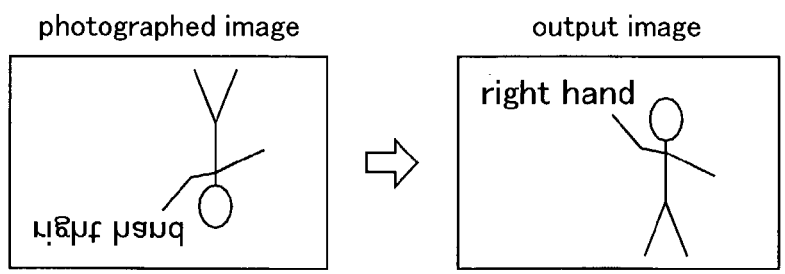

On the other hand, if the camera 354 photographs the audience, the reflector 363 is positioned at the position of the solid line in FIG. 26A. In this case, as shown in FIG. 28B, the direction of the top and bottom of the image of the audience is opposite of the one of the photographed image of the material T3, and is mirror-inverted. At this time, since the other sensor 368a senses the reflector 363, the control arithmetic operation section 303 operates the process of a step S305. In step S305, the control arithmetic operation section 303 operates an image processing of rotating the mirror image photographed by the camera 354 at an angle of 180° and transforming that image to a normal image. Next, in step S303, the processed image of the audience is projected from the projector 302 onto the screen 301.

According to the above-described material presenting device, since the direction of an optical path in which light enters into the camera 354 is switched by the reflector 363 positioned in the material photographing optical path L3, and it is thereby not necessary to tilt the camera 354 when switching the photographing direction of the camera 354. Thus, the harness of the camera 354 is not twisted, whereby trouble such as breakage of the harness can be prevented.

According to the above-described embodiment, the material presenting device is composed to switch the photographing direction of the camera 354 by the swing arm 361 and the reflector 363, whereby the constitution of the material presenting device is simplified, as compared with the conventional device composed to tilt the entire body of the camera 354. In addition, since the reflector 363 is held by the ball plunger 365 at a predetermined angle position, the photographing direction can be switched between the presenter thereof and the audience thereof easily.

Furthermore, according to the above-described embodiment, the control arithmetic operation section 303 transforms the mirror image which is photographed by the camera 354 to a normal image and, moreover, rotates the image of which the top and bottom are reversed, at an angle of 180°, whereby the projected image onto the screen 301 is clearly visible and the presentation can be more effective.

(4) Fourth Embodiment

Figure 29:
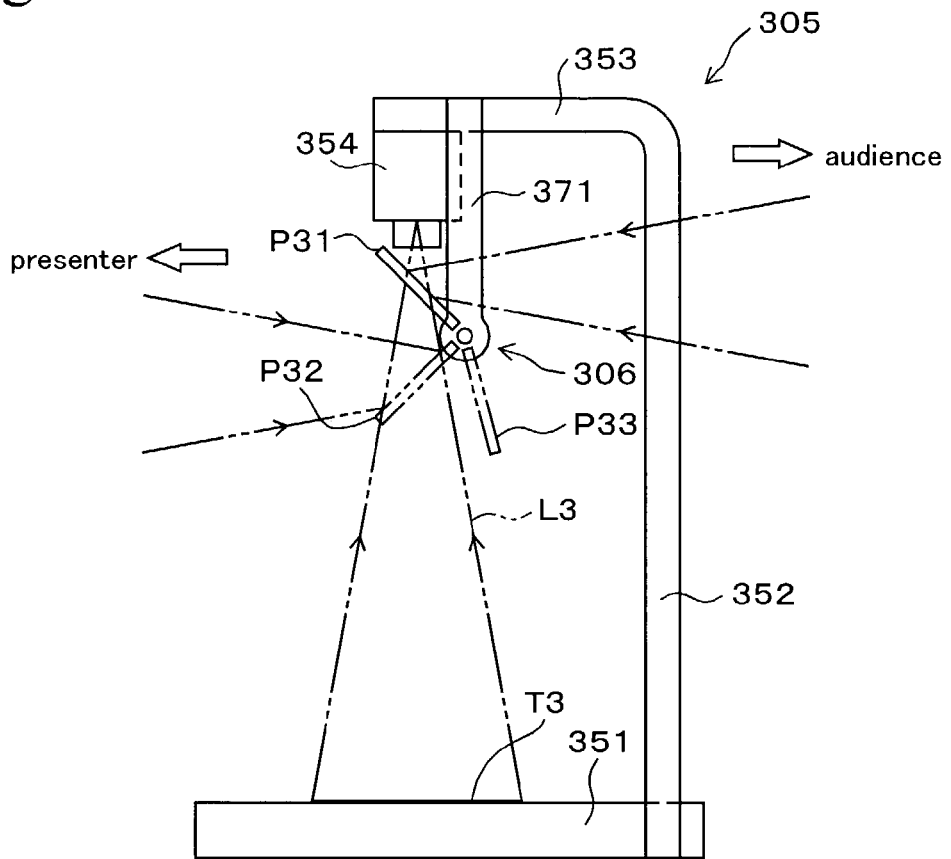
FIG. 29 is a side view showing a material presenting device in the fourth embodiment according to the present invention.

The fourth embodiment of the present invention is described with reference to FIG. 29 and FIG. 30. From the fourth embodiment to the sixth embodiment, the same numeral symbol denotes the same configuration as the third embodiment, and the explanations of the same are omitted. According to the fourth embodiment, as shown in FIG. 29, a pair of frames (supporting arm) 371 (the one shown in FIG. 29) is used instead of the swing arm 361. The upper end portion of the frame 371 which is positioned to place the camera 354 therebetween is provided at the arm 353 supporting the camera 354, and extends downward from that position. A shaft 364 is mounted at the lower end portion of the frame 371, and the one side portion of the reflector 363 is rotatably supported by the shaft 364.

Three ball plungers 365 which are separated from each other in the circumferential direction are positioned at the lower end portion of the frame 371. The ball plungers 365 are of the same configuration as the one shown in FIG. 26C, and the same ball plungers are formed at the side of the reflector 363 or the side of the holder of the reflector 363, whereby the reflector 363 is held to be at a predetermined angle at the three relative positions.

Figure 30:
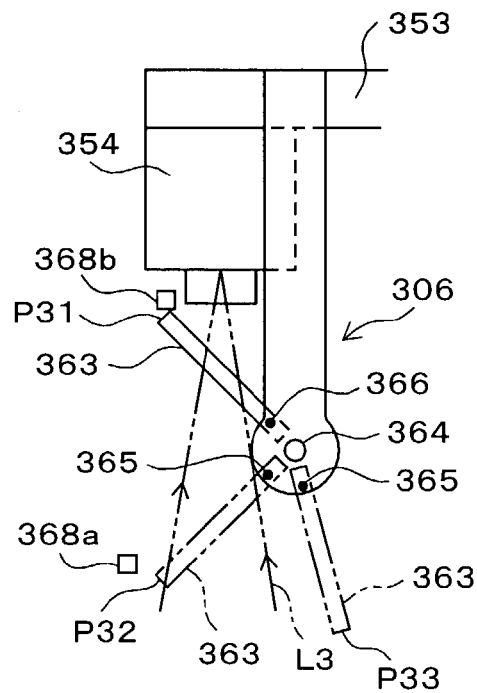
FIG. 30 is a diagram showing an important part of the material presenting device in the fourth embodiment according to the present invention.

FIG. 30 shows the two positions at which the reflector is held. A solid line in FIG. 30 shows the position (P31) in which the image of an audience is reflected by the reflector 363 and enters the camera 354. A two dot-chain line adjacent to the solid line in FIG. 30 shows the position (P32) at which the image of a presenter is reflected by the reflector 363 and enters the camera 354. The camera 354 is equipped with a pair of sensors 368a and 368b via a bracket (not shown) so that the reflector 363 senses the former position or the latter position. The other two dot-chain line shows the position (P33) in which the reflector 363 does not interfere with the material photographing optical path L3. In this case, the position of P31 is at an angle of about 45° with reference to the horizontal direction and the position of P32 is at an angle of about 30° with reference to the horizontal direction.

Figure 27:
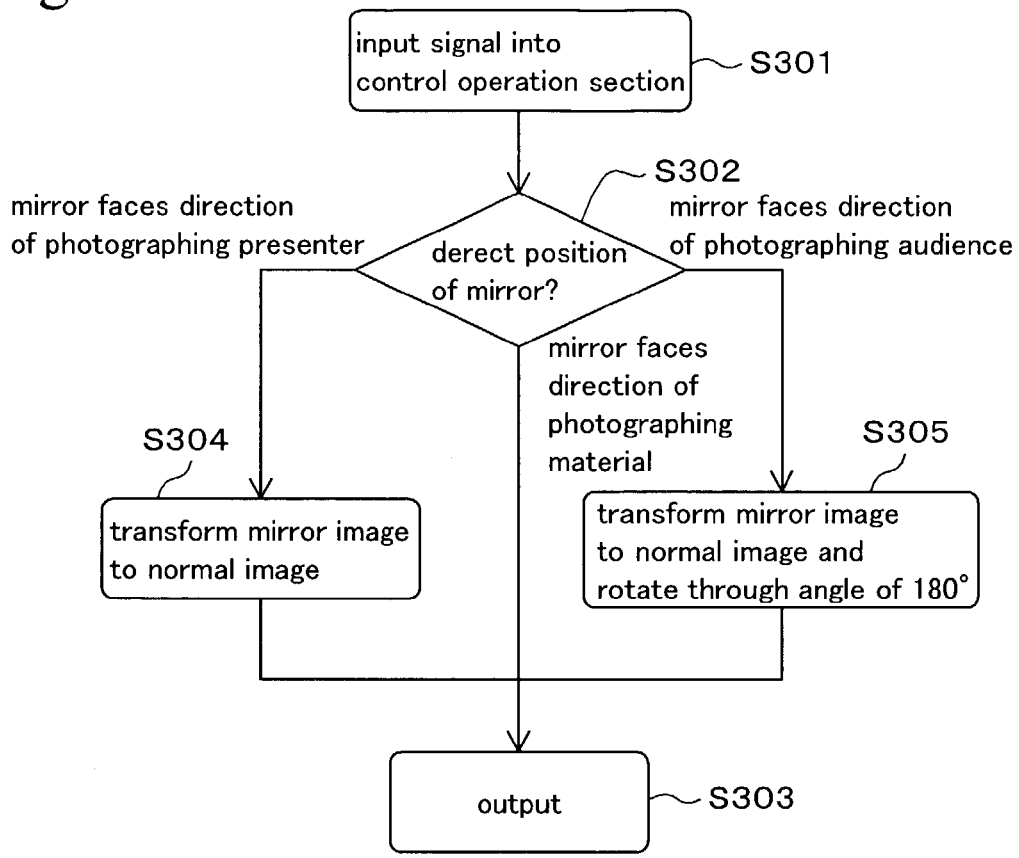
FIG. 27 is a flow chart showing an operation in the third embodiment according to the present invention.

According to the material presenting device in the above-described embodiment, when the reflector 363 is positioned at the position P33, the material T3 is photographed by the camera 354. When the reflector 363 is positioned at the position of P32, the presenter is photographed by the camera 354. When the reflector 363 is positioned at the position of P31, the audience is photographed by the camera 354. The positions of the reflector 363 is sensed by the sensors 368a and 368b, whereby the control arithmetic operation section 303 executes the image processes as shown in FIG. 27, and the normal image is projected from the projector 302 onto the screen 301. Thus, in the fourth embodiment, the same actions and effects as in the third embodiment can be obtained. In particular, according to the fourth embodiment, the material presenting device is composed to rotate only the reflector 363, whereby the number of movable portions can be minimal. Thus, it is possible to further simplify the material presenting device.

It is possible to control in the following manner so as to sense the reflector 363 in the material photographing optical path L3 and the direction of the reflector 363, instead of by the results of sensing of the sensors 368a and 468b in the third and the fourth embodiment. That is, the sensor senses only that the reflector 363 is placed in the material photographing optical path L3, and thereby the operation of transforming a mirror image to a normal image is performed automatically. In addition, the angle of the reflector 363 is sensed by a rotary encoder which is connected to the shaft 364, and the correction of the direction of the top and bottom (rotating through an angle of 180°) is performed when the reflector 363 inclines to reflect the audience. On the other hand, when the reflector 363 inclines to reflect the presenter, the operation (rotating through an angle of 180°) is not executed. In this case, the reflector 363 is rotated by hand.

(5) Fifth Embodiment

Figure 31:
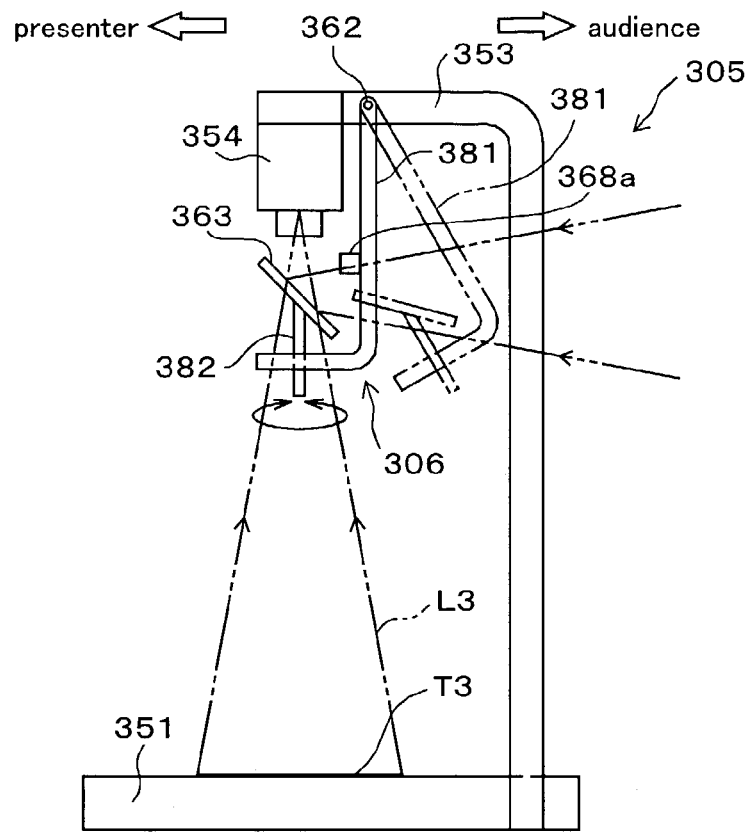
FIG. 31 is a side view showing a material presenting device in the fifth embodiment according to the present invention.

The fifth embodiment of the present invention is described with reference to FIG. 31. According to the fifth embodiment, as shown in FIG. 31, a swing arm 381 (supporting arm) is used. The upper end portion of the swing arm 381 is rotatably supported by the arm 353 which supports a camera 354. The lower end portion of the swing arm 381 is bent perpendicular to the upper end portion so as to form an L-shape. A shaft 382 is rotatably provided at the lower end portion of the swing arm 381. The reflector 363 is provided at the upper end portion of the shaft 382. The shaft 382 is rotated by a motor, and the rotating angle of the shaft 382 is sensed by a rotary encoder (neither are shown in FIG. 31).

Two ball plungers (not shown) which are apart from each other in the circumference direction are positioned at the upper end portion of the swing arm 381. The ball plungers are of the same configuration as the one shown in FIG. 26C, and the same ball plungers are formed at the side of the swing arm 381, whereby the swing arm 381 is held at the position in which the upper end portion is directed vertically or at a position which is apart from that position. At the former position, the shaft 382 is positioned in the optical axis of the camera 354. At the latter position, the reflector 363 interferes with the material photographing path L3. In addition, as shown in FIG. 31, the sensor 368a which senses that the swing arm 381 is positioned to be directed vertically is provided.

According to the fifth embodiment, when the swing arm 381 is set at the position of a two dot-chain line in FIG. 31 and the reflector 363 is out of the material photographing optical path L3, the material T3 is photographed by the camera 354. On the other hand, when the swing arm 381 is rotatably positioned to be directed vertically, the presenter or the audience is photographed by the camera 354. In this case, the swing arm 381 is sensed by the sensor 368a, whereby the operation of transforming a mirror image to a normal one is performed automatically.

The direction of the reflector 363 is sensed by a rotary encoder, and when the reflector 363 is directed to reflect, the top and bottom of the photographed image of the presenter corresponds with that of the material T3, whereby the sensed angle by the rotary encoder is 0°. In this case, the control arithmetic operation section 303 operates the image processing of rotating the image photographed by the camera 354 at the same angle as the results of the rotary encoder (from an angle of 0° to an angle of 180°), whereby the image of which the top and bottom is normal is projected even if the reflector is directed in any direction.

It is possible to rotate by hand instead of the above-described rotary encoder. For example, a switch of "positive rotating" and "negative rotating" is provided on the material mounting pedestal 351 and the rotating angle is changed to be increased or decreased. In addition, a switch of "0" or "reset" is provided, whereby the projected image is restored to the state in which the image is not rotated.

(6) Sixth Embodiment

Figure 32:
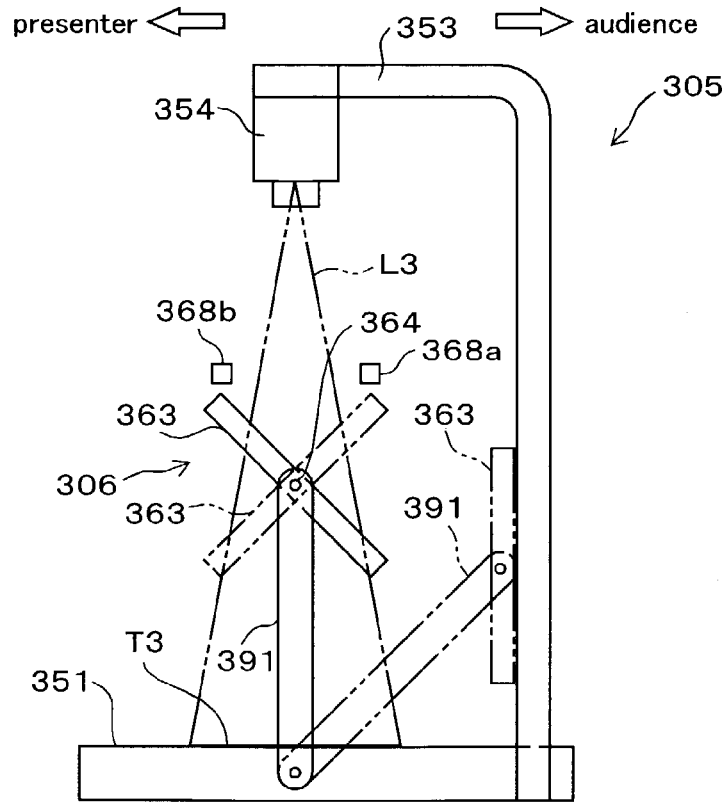
FIG. 32 is a side view showing a material presenting device in the sixth embodiment according to the present invention.

The sixth embodiment of the present invention is described with reference to FIG. 32. That a swing arm 391 (frame) is rotatably supported by a material mounting pedestal 351 in the sixth embodiment is different from the third embodiment. In the sixth embodiment, the sensors 368a and 368b which sense the position of the reflector 363 are also provided. In addition, the ball plungers (not shown) which hold the swing arm 391 and the reflector 363 at two positions are provided in the same manner as the third embodiment. In addition, according to the sixth embodiment, the same actions and effects as in the third embodiment can be obtained.

(7) Seventh Embodiment (A) Configuration of the Seventh Embodiment

Figure 33:
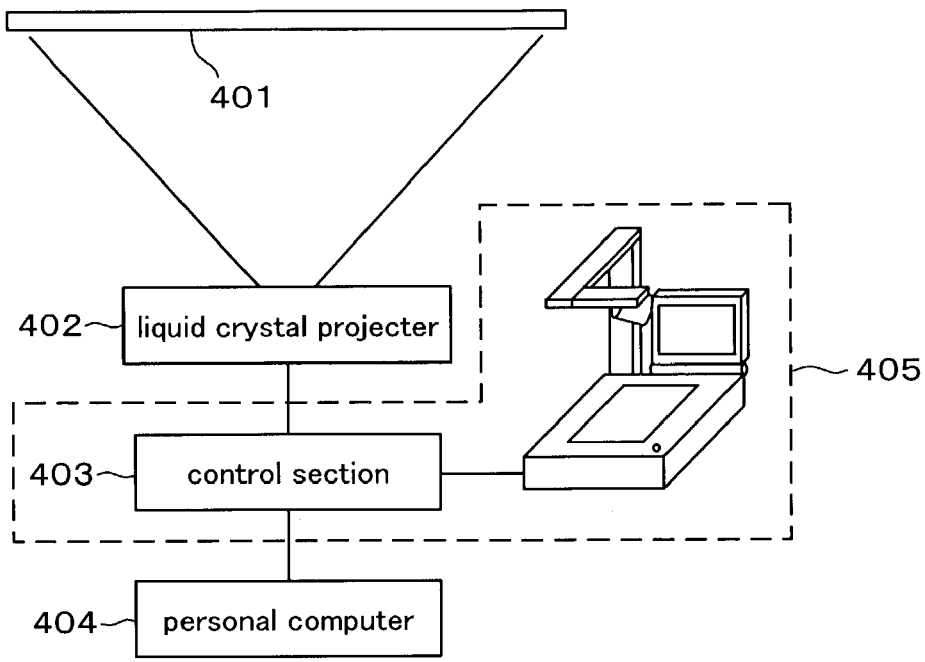
FIG. 33 is a schematic diagram of a presentation system using a material presenting device in the seventh embodiment according to the present invention.

The seventh embodiment of the present invention is described below with reference to FIG. 33 to FIG. 38. FIG. 33 schematically shows the whole presentation system equipped with a material presenting device in this embodiment. In FIG. 33, numeral symbol 401 denotes a screen, 402 denotes a liquid crystal projector which projects an image onto the screen 401, 403 denotes a control section (control device), and 404 denotes a personal computer. Image data is generated by the personal computer 404, and the image data and relative commands are input from the personal computer 404 into the control section 403. The image data processed by the control section 403 is input into the liquid crystal projector 402 and the image based on the image data is projected from the liquid crystal projector 402 onto the screen 401.

Figure 34:
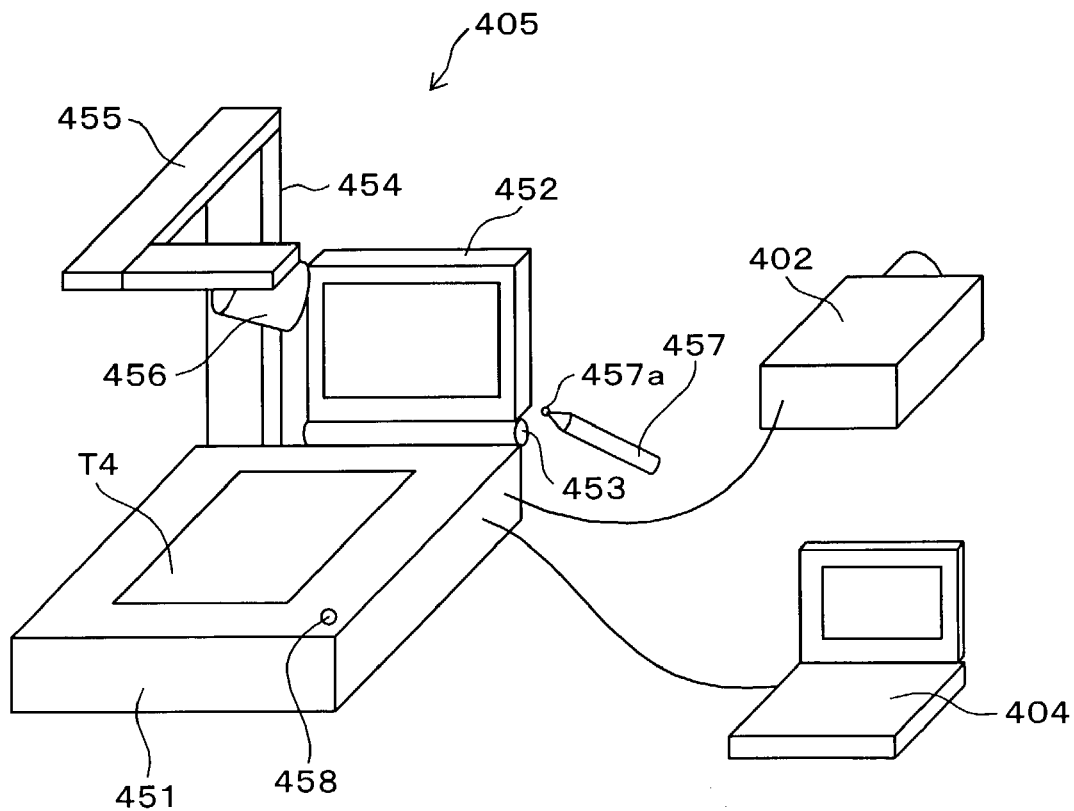
FIG. 34 is a schematic perspective view showing the material presenting device in the seventh embodiment according to the present invention.

In FIG. 33, reference numeral 405 denotes a material presenting device. As shown in FIG. 34 schematically, this material presenting device 405 is equipped with a material mounting pedestal (material mounting device) 451 in the shape of a rectangular box, which is set to be the base of the device. A display (displaying device) 452 is rotatably supported by a shaft 453 at one side of the material mounting pedestal 451. The emitting sections 452a is positioned at the four corner points of the display 452 (reference to FIG. 36). A stand 454 is provided at the side of the display 452. An arm 455 which extends horizontally so as to form an L-shape is provided at the upper end portion of the stand 454. A photographing section (photographing device) which is positioned at the center of the upper side of the material mounting device 451 is provided at the leading end portion of the arm 455.

The photographing section 456 is equipped with a camera which has a lens and a charge coupled device (CCD), and the camera has an auto-focus function and a zoom function. In addition, the photographing section 456 is supported by the arm 455, so as to rotate within the range from the position of directing toward the display 452 to a position directed toward a material T4 mounted on the material mounting pedestal 451. The photographing section 456 is rotated by a driving device within the above-described range. Furthermore, the photographing section 456 is equipped with an optical filter which allows only infrared light to pass therethrough, and light which enters the camera is switched between visible light and infrared light thereby. This optical filter is removably positioned in the optical path of the camera.

A light pen (pointing device) 457 with which a presenter indicates on the display 452 is provided on the material mounting pedestal 451. An light emitting section 457a emitting infrared light, which is composed of a light emitting diode, is provided at the tip end of the light pen 457. The light pen 457 is used by pressing the light emitting section 457a on the display 452, and has a built-in press switch which is switched to ON, when the light emitting section 457a is pressed.

A menu switch 458 is provided on the material mounting pedestal 451. The menu switch has a function of switching over between a photographing mode in which a photographed image of the material T4 photographed by the photographing section 456 or the like is displayed on the display 452 and a menu mode in which a command image is displayed on the display 452.

Figure 35:
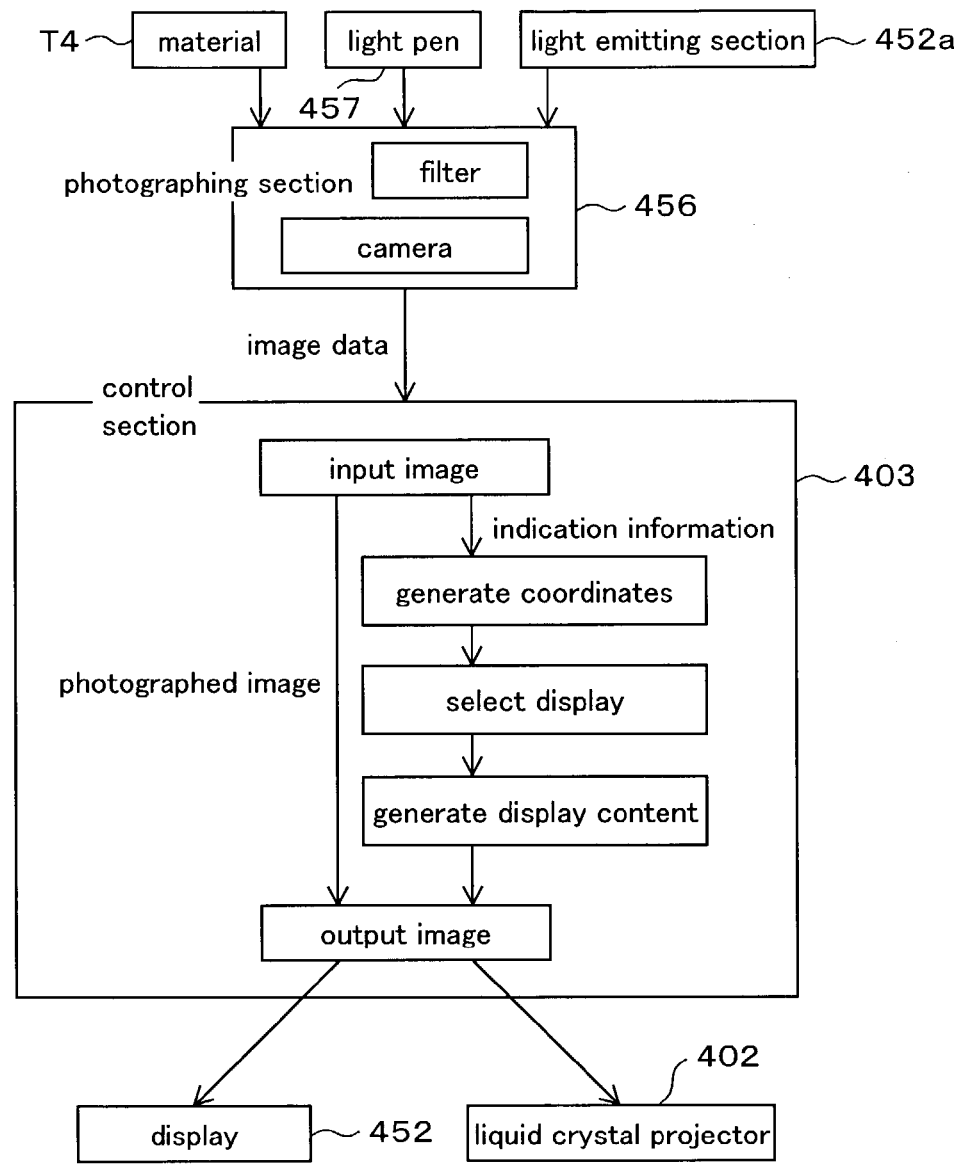
FIG. 35 is a control block diagram showing the function of the material presenting device in the seventh embodiment according to the present invention.

FIG. 35 is a control block diagram showing a function of the control section 403 or the like of the material presenting device 405 in the seventh embodiment. The control section 403 is provided in the material mounting pedestal 451. As shown in FIG. 35, infrared light which is emitted by the light pen 457 and the light emitting sections 457a and 452a enters the camera and invisible light which is reflected by the material T4 enter the camera directly. The photographing section 456 outputs the image data on the photographed image by the camera to the control section 403.

When the optical filter is not used, the control section 403 outputs the input image to the display 452 or the liquid crystal projector 402 as it is. On the other hand, when the optical filter is used and the photographing section 403 photographs the display 452, the control section 403 recognizes the positions of the light emitting sections 452a and sets a rectangular area which connects the positions of the light emitting sections 452a (hereafter, this area is called a "virtual screen").

Figure 36A:
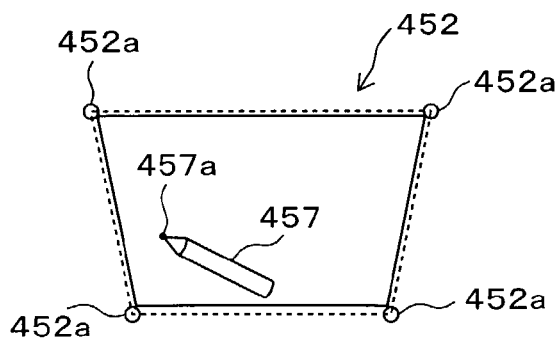
FIG. 36 is a diagram explaining setting of a virtual screen and correction of distortion of the virtual screen in the seventh embodiment according to the present invention.
Figure 36B:
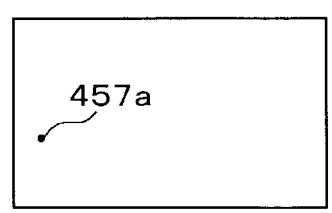

FIG. 36 shows processes of setting and correcting the virtual screen. Since the display 452 is inclined with respect to the photographing section 456, the shape (corresponding to the display 452) made by connecting the light emitting sections 452a of the four corner points is distorted into a trapezoidal shape within the angle of the photographing section 456 (as shown in FIG. 36A). The control section 403 corrects the distortion by an image processing technique, based on the four corner points of the light emitting sections 452a and corresponds to XY coordinates, as shown in FIG. 36B. In addition, the correction of the coordinates is performed by applying a method in which the display 452 emits white light, and the display area of the display 452 thereby differs from the frame of the display 403 in contrasting color, wherein the display area is recognized.

When light emitting section 457a of the light pen 457 is pressed on the display 452 and thereby emits light, the control section 403 calculates the coordinates of the light emitting sections 457a on the virtual screen in which distortion is corrected. The control section 403 selects a display content corresponding to the coordinates of the light emitting sections 457a, and executes an operation indication corresponding to the selected display content or issues a command for executing the operation.

(B) Operation of the Seventh Embodiment

Figure 37A:
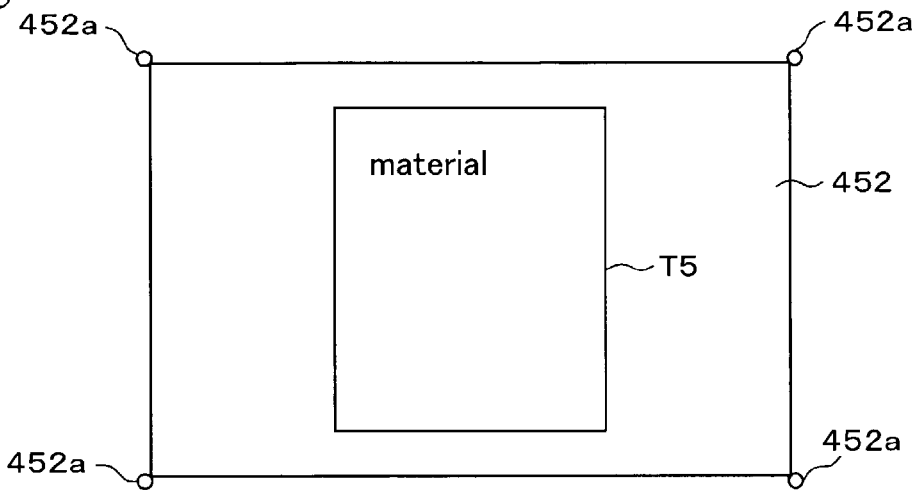
FIG. 37A is a diagram showing the display of a display in photographing mode, and FIG. 37B
Figure 37B:
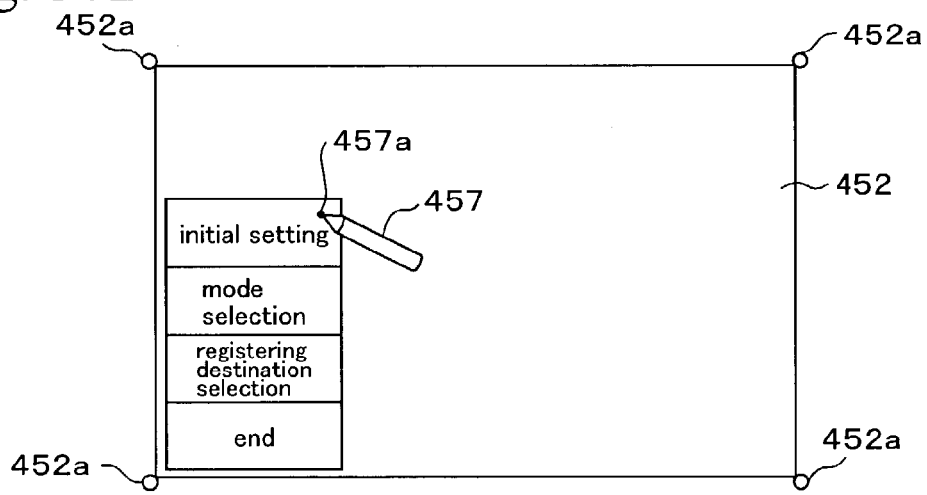
FIG. 37C is a diagram showing the display of a display in menu mode in the seventh embodiment according to the present invention.
Figure 37C:
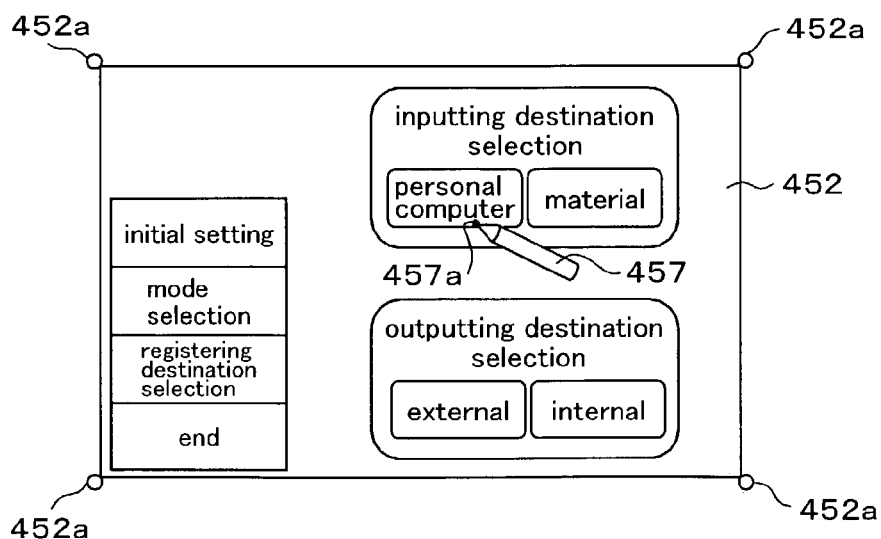
Figure 38:
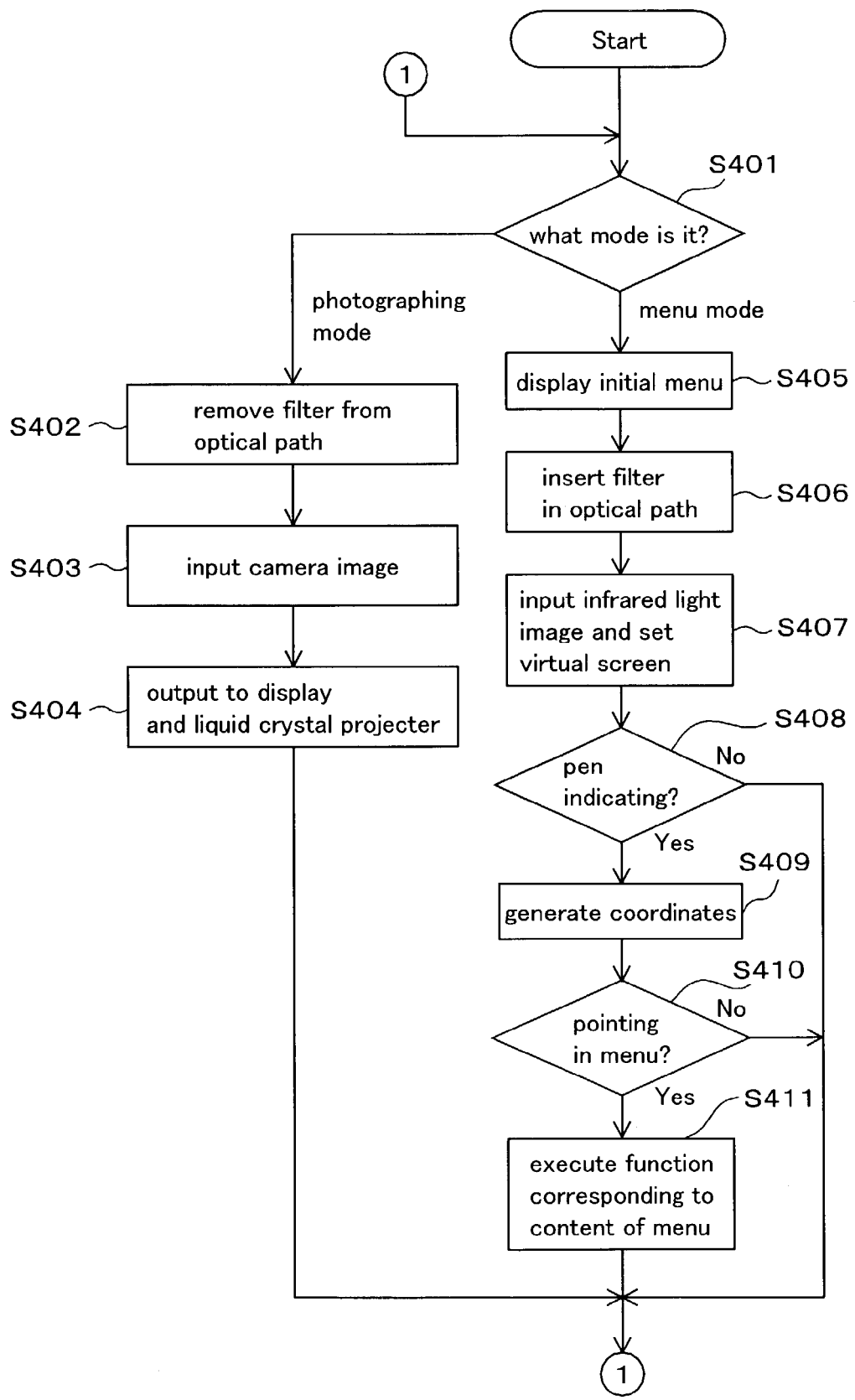
FIG. 38 is a diagram showing a flow chart the operation of the material presenting device in the seventh embodiment according to the present invention.

The operation of the above material presenting device 405 is described below with reference to FIG. 38, etc. First, the control section 403 decides whether or not the menu switch 458 is pressed (in step S401), the processing of the photographing mode is executed when the menu switch 458 is not pressed. In the photographing mode, the control section 403 removes the optical filter from the optical path of the camera (in step S402), and inputs the image data of the material T4 which the photographing section 456 photographs (in step S403). The control section 403 outputs the image data to the display 452 and the liquid crystal projector 402, whereby the image of the material T4, shown in FIG. 37A, is displayed on the display 452 and is projected onto the liquid crystal projector 402.

When the menu switch 458 is pressed, the processing of the menu mode is executed. In the menu mode, first, the display 452 displays an initial menu which is composed of a plurality of the indication displays (command images) shown in FIG. 37B (in step S405). At that time the control section 403 continues to output the image projected when the menu switch is pressed to the liquid crystal projector 402. Next, the control section 403 puts the optical filter in the optical path of the camera (in step S406), directs the photographing section 456 to the display 452, inputs the image data of the photographed image, sets the virtual screen, based on the positions of the light emitting sections 457a which are set at the four corner points, and corrects the distortion of the virtual screen (in step S407). When the virtual screen is set, the light emitting sections 457 can be turned off.

When the light emitting section 457a of the light pen 457 is pressed on the display 452 and then emits infrared light, the operation proceeds from a step S408 to a step S469 and the control section 403 generates the coordinates of the light emitting section 457a of the light pen 457 on the corrected virtual screen (in step S409). In this case, when the coordinates of the light emitting section 457a of the light pen 457 is in one of the indication displays of the initial menu, the operation proceeds from a step S410 to a step S411, and the control section 403 executes the function corresponding to the content of the initial menu. For example, when the light emitting section 457a emits light in the frame of "initial setting" shown in FIG. 37B, the display 452 displays the initial setting menu shown in FIG. 37C.

The "inputting destination selection" and the "outputting destination selection" are displayed on the initial setting menu. The "personal computer" and the "material" are provided at the "inputting destination selection". The "external" and the "internal" are provided at the "outputting destination selection". When the light emitting section 457a of the light pen 457 emits light in the frame of the "material" of the "inputting destination selection", the control section 403 inputs the image by the personal computer 404. When the light emitting section 457a of the light pen 457 emits light in the frame of the "material" of the "inputting destination selection", the control section 403 inputs the image by the personal computer 404. When the light emitting section 457a of the light pen 457 emits light in the frame of the "external" of the "outputting destination selection", the control section 403 outputs the input image data to the liquid crystal projector 402. When the light emitting section 457a of the light pen 457 emits light in the frame of the "internal", the control section 403 outputs the input image data to the display 452.

When the function corresponding to the indication display of the menu is executed in the above-described manner, the operation returns to a step S401, and the operations are repeated to a step S411. If the menu switch is pressed or the light emitting section 457a emits light in the frame of the indication display of the menu while the above-described operations are executed, the operations proceed from a step S401 to a step S402, and the operation of the photographing mode is executed.

According to the material presenting device 405 in the seventh embodiment, since the operation specified by the indication display is performed when the light emitting section 457a emits light in the frame of the indication display of the menu, the indication display of the menu executes the function of the switch. Thus, the selection of the menu is executed by the light pen 457, whereby the number of the physical switches such as push buttons and dials can be reduced, it is possible to easily use the device, and the appearance of the device is improved. In addition, peripherals such as keyboards and a setting place therefor are not needed, and the cost does not increase, in contrast to the case of using the touch panel.

(C) Arrangement

This invention is not limited to the above-described embodiment and various arrangements can be made.

1. Mouse Function of the Personal Computer

The screen of the personal computer is displayed on the display 452 and the indication position of the light pen 457 is transmitted as mouse information to the personal computer 404, whereby a mouse function of the personal computer 404 can be realized by the light pen 457. In this case, click buttons (left and right) are provided on the light pen 457, whereby control of the light emitting of the light emitting section 457 is convenient.

2. Image Synthesizing Function

It is possible to synthesize the menu image with the image of the display of the personal computer used in the presentation and to thereby display the synthesized image on the display 452. In addition, this synthesized image data can be output to either the display or the liquid crystal projector 402, or to both of them.

3. Pointing Function

It is possible for the image of the display of the personal computer or the photographed image of the material T4 to be indicated by the light pen 457, the point image or the line is synthesized at the indicated position, and the synthesized image is projected from the liquid crystal projector. In this case, the coordinates of the light emitting section 457a of the light pen 457 can be calculated by executing the setting of and the correction of the distortion of the virtual screen in the above-described manner. In this case, the pointing function and the above-described function selection such as the menu selection can be executed by switching or by other methods.

4. The photographing section 456 can be rotated at the side of the material T4 and the display 452 by hand instead of the driving device in the above-described embodiment. In addition, the number of the light emitting sections 452*a* of the display 452 may be three. In this case, it is possible to correspond to the display 452 which is set inclined, in the above embodiment.

5. The setting of and the correction of the distortion of the virtual screen is regularly set beforehand, whereby the emitting sections 452*a* may be unnecessary.

(8) Eighth Embodiment

Figure 39:
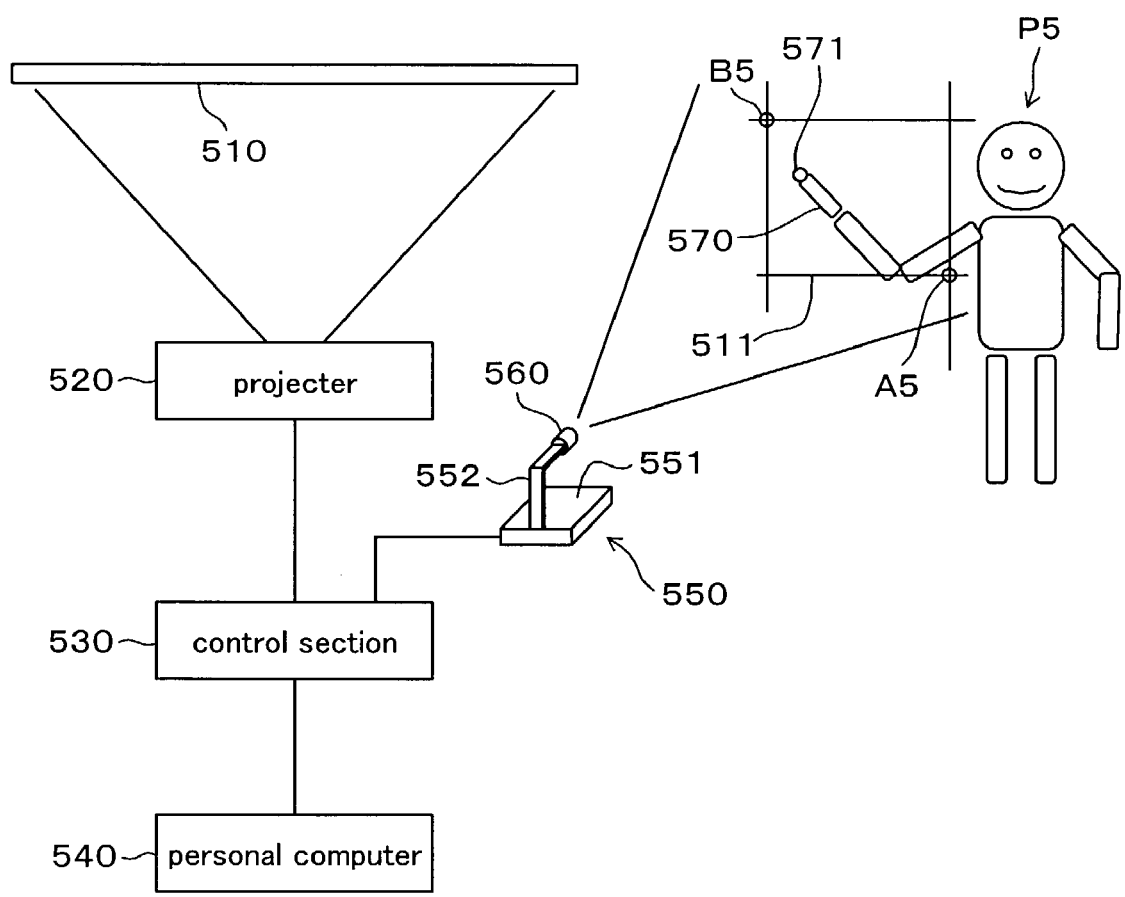
FIG. 39 is an schematic diagram showing a presentation system comprising a photographing device in the eighth embodiment according to the present invention.

FIG. 39 schematically shows the overall presentation system equipped with a material presenting device in the eighth embodiment. In FIG. 39, reference symbol P5 denotes a presenter, 510 denotes a screen, 520 denotes a projector which projects an image onto the screen 510, 530 denotes a control section, and 540 denotes a personal computer. Image data is generated by the personal computer 540, and the image data is input from the personal computer 540 into the control section 530. The image data processed by the control section 530 is input into the projector 520 and the image based on the image data is projected from the liquid crystal projector 520 onto the screen 510.

Figure 40:
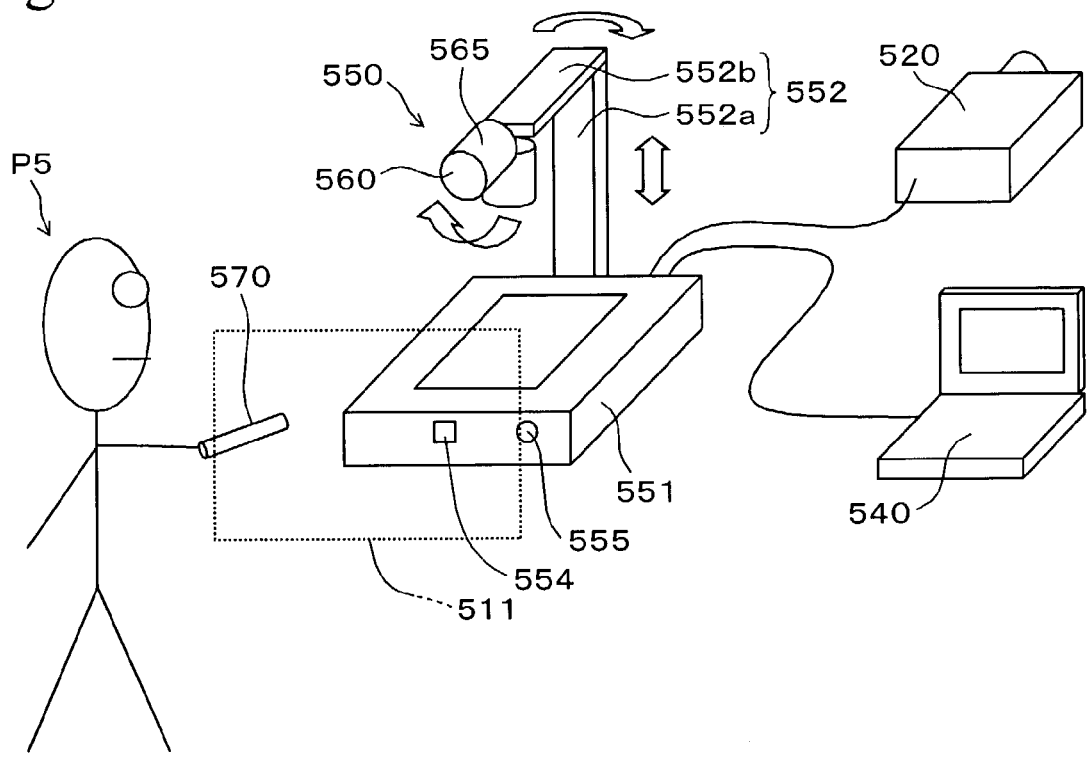
FIG. 40 is a schematic perspective view showing the presentation system in the eighth embodiment according to the present invention.

In FIG. 39, reference numeral 550 denotes a material presenting device. As shown in FIG. 40, this material presenting device 550 is equipped with a material mounting pedestal 551, a camera section 560 as a photographing device supported by this material mounting pedestal 551 via an arm 552. The control section 530 is provided in the material mounting pedestal 551.

The arm 552 has an inverted L-shape composed of a vertical portion 552*b* extending vertically and a horizontal portion 552*b* at the upper end of the vertical portion 552*a*. The horizontal portion 552*a* extends forward of the material mounting pedestal. The vertical portion 552*a* is extendible, and the horizontal portion 552*b* is rotatable with respect to the vertical portion 552*a*. The extension and retraction of the vertical portion 552*a* and the rotating of the horizontal portion 552*b* are performed by hand, and can be fixed at an arbitrary position. The horizontal portion 552*b* is generally fixed to extend forward so that materials such as documents on the material mounting pedestal 221 can be photographed as objects.

The camera section 560 is provided at the leading end of horizontal section 552*b* of the arm 552 via a pedestal for mounting on a camera or the like to reciprocate so that the photographing direction may be directed downward and forward or backward with a range which is beyond the horizontal. The position of the camera 560 is switched between the downward position for photographing the material mounted on the material mounting pedestal 551 and the forward position automatically or by hand.

Figure 41:
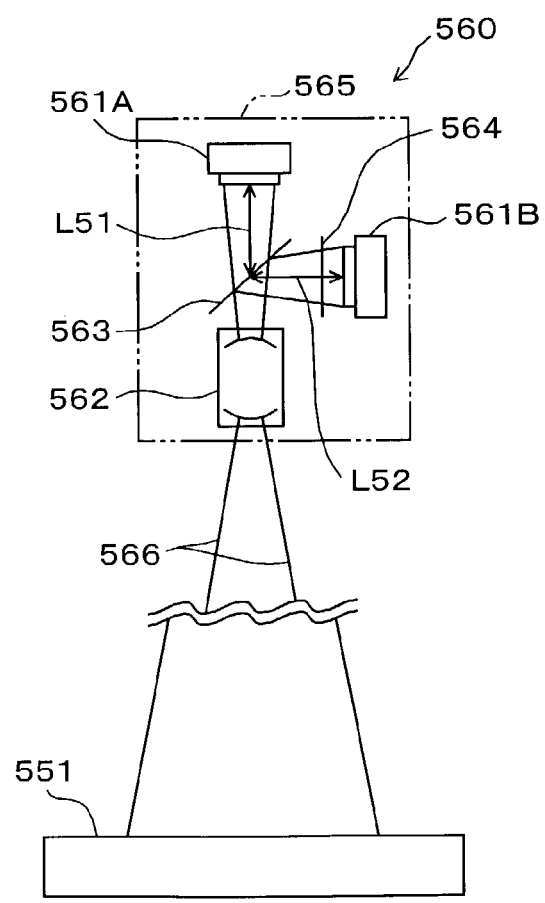
FIG. 41 is a side view showing a configuration of a camera section in the eighth embodiment according to the present invention.

FIG. 41 shows details of the camera section 560. This camera 560 is equipped with two photographing elements 561A and 561B, a zoom lens 562, a beam splitter 563, and an optical filter 564, and these components are provided in a camera head 565. The camera section 560 has an autofocus function. The photographing elements 561A and 561B are composed of a charge coupled device (CCD). FIG. 41 shows the state in which the camera section 560 is directed downward. In this state, the optical axis of the zoom lens 562 is perpendicular to the material mounting pedestal 551, and the beam splitter 563 is provided above the zoom lens 562.

The two photographing elements 561A and 561B are a normal photographing camera and an infrared light photographing camera respectably. The photographing element 561A for normal photographing is located above the beam splitter 563. The photographing optical path is directed downward so that an object image on the material mounting pedestal 551 is brought into focus by the zoom lens 562. That is, the photographing optical path above the zoom lens 562 is divided into a normal photographing path and an infrared light photographing path by the beam splitter 562. The photographing element 561A for the normal photographing is located in the normal photographing path, and the photographing element 561B for infrared light photographing is located in the infrared light photographing path. An optical filter 564 which enables photographing only infrared light is located between the photographing element 561B for the infrared light photographing and the beam splitter 563 so as to be in the photographing optical path of the photographing element 561B.

The beam splitter is composed of a half mirror or half prism, and is inclined so as to cross the optical axis of both the photographing element 561A and the photographing element 561B at an angle of 45°. The optical path of the beam splitter 563 for the photographing element 561A is a transmitting optical path and transmits the beam splitter 563. On the other hand, the optical path of this beam splitter 563 for the photographing element 561B is a reflecting optical path, passes through the zoom lens 562, is reflected by the beam splitter so that the optical axis bends at angle of 90°, and leads to the photographing element 561B.

As described above, the length of the optical path from the beam splitter 563 to the photographing element 561A is approximately equal to that of the optical path which leads from the beam splitter 563 to the photographing element 561B, whereby the angle of view of the photographing element 561A is approximately the same as that of the photographing element 561B. The line 566 in FIG. 41 shows an angle of view at which the zoom lens 562 is focused onto the relative photographing elements 561A and 561B.

The photographed images of the photographing elements 561A and 561B are input into the control section 530. In the control section 530, the infrared light photographed image data of the photographing elements 561B is used to extract a synthesized position of a point image or a reference point of a virtual screen.

Figure 42:
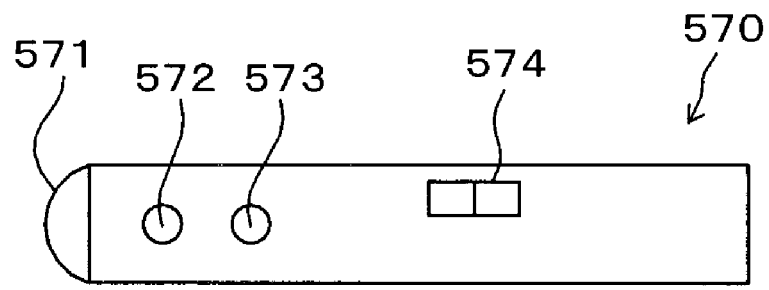
FIG. 42 is a plan view of a communication box in the eighth embodiment according to the present invention.
Figure 43:
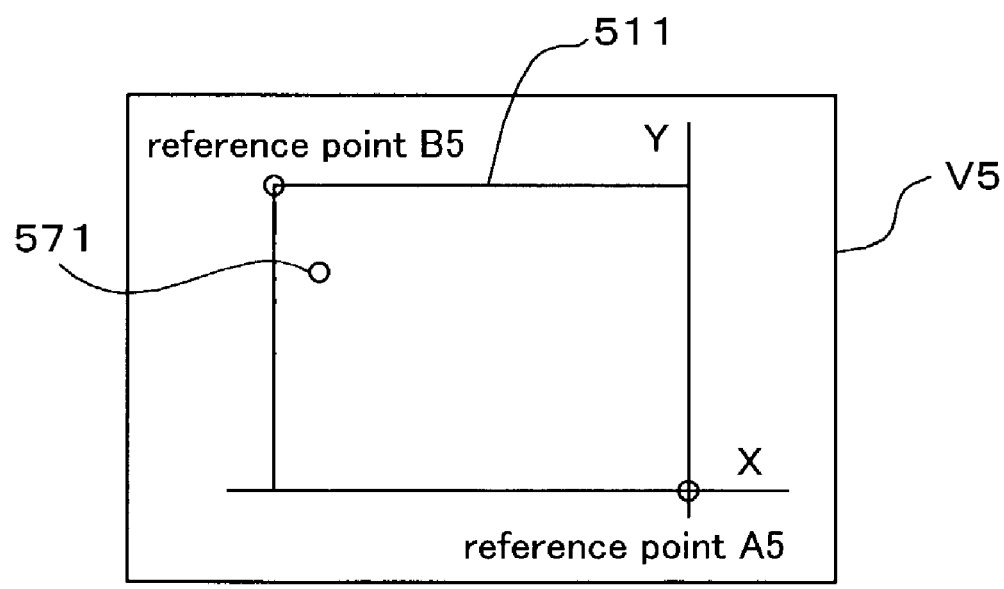
FIG. 43 is a diagram showing a virtual screen generated with a photographing range of the camera in the eighth embodiment according to the present invention.

The presenter has a communication box 570 held in a hand as shown in FIG. 39 and FIG. 40. As shown in FIG. 42, a light emitting section 571 composed of a light emitting diode which emits light including infrared light is provided at the tip end section. This emitting section 571 is an indication device which is used to set reference points A5 and B5 of a virtual screen 511 in FIG. 39 and FIG. 40 and to perform a pointing operation. The virtual screen 511 is set in a space, for example, on the left of the presenter, based on an orthogonal line which connects the reference points A5 and B5. As shown in FIG. 43, the virtual screen 511 is a rectangular two dimensional space which has an X-axis (horizontal axis) and a Y-axis (vertical axis) to virtually operate a point by the light emitting section 571 to be on. The virtual screen 511 is set to fall within a range which can be covered by the movement of the right arm of the presenter P5.

The communication box 570 is equipped with a reference point setting switch 572 for setting the reference points A5 and B5 by allowing the light emitting section 571 to emit a light beam, and a pointer switch 573 is used for a pointing operation. If the reference point setting switch 572 is turned on, infrared light for the reference point setting is emitted from the light emitting section 571. If the pointer switch 573 is turned on, infrared light during pointing is emitted from the light emitting section 571.

As shown in FIG. 40, a light receiving section 554 which receives infrared light and a recognition display section 555 which flickers to notify the presenter P5 that this light receiving section 554 is recognizing the infrared light for the reference point setting and the position of the light emitting point, based on the infrared light photographed image by the photographing element 561B are provided at the front face of the material mounting pedestal 551. The light receiving section 554 is composed of a photo diode and the recognition display section 555 is composed of a light emitting diode. The photographed image by the camera section 560 is input into the control section 530. The function of the magnification adjustment and auto-focus of the camera section 560 is controlled by the control section 530 so as to automatically search the initially set reference point A5 using the light emitting section 571 and to locate the reference point A5 at a predetermined position within the field of view of the camera section 560.

The communication box 570 is equipped with an image change switch 574. The image change switch 574 is for selecting the image (personal computer image) by the personal computer 540 or the photographed image by the photographing element 561 A for the normal photographing of the camera section 550 as an image to be projected from the light crystal projector 2 onto the screen 1. If this image change switch 574 is turned on, the infrared light for changing an image is emitted by the infrared light emitting section 551, and the infrared light is received by the receiving section 554 of the material mounting pedestal 551, and the receiving signal is input into the control section 530. At that time, the control section 530 switches from the personal image to the camera image or in reverse order and outputs the image signal to the projector 520.

The infrared light which is emitted so as to turn on the reference point setting switch 574, the pointer switch 573, and the image change switch 574 is recognized, based on the difference of the modulated frequency or the modulated pattern. It is possible to emit three kinds of infrared light which differ from one another in wavelength.

The control section 530 generates XY coordinates of the virtual screen 511 based on the reference points A5 and B5 which are photographed by the photographing element 561B of the camera section 560, by an ordinary image analysis method. The position of the light emitting section 571 which is moving on the virtual screen 511 is always photographed by the photographing element 561B, and input into the control section 530. The control section 530 sequentially calculates the coordinates of the light emitting section 61 on the coordinates of the virtual screen 511. The control section 530 processes the image data which is output to the projector 520 and the coordinate data of the light emitting section 571, and synthesizes a point image with the calculated coordinates of the light emitting section 571 on the output image.

One arrangement of a way of using the above-described presentation system is described below as the case of "pointing at a position away from the material presenting device" and "pointing on the material mounted on the material presenting device".

(1) Pointing at the Position Apart from the Material Presenting Device

Figure 44:
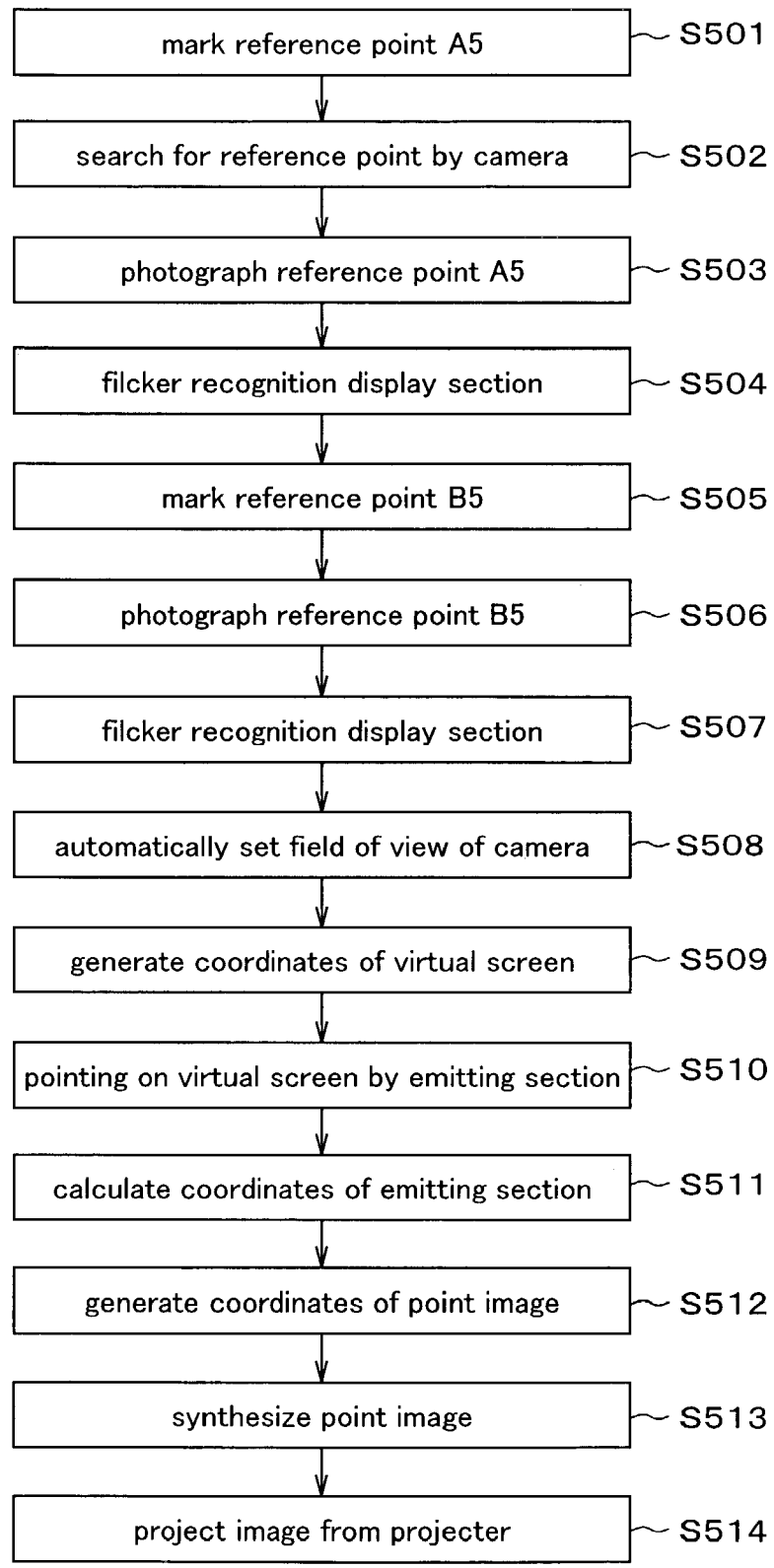
FIG. 44 is a flow chart showing the operations of the presentation system in the eighth embodiment according to the present invention.

The operation of pointing using the virtual screen 511 is described with reference to FIG. 44.

(A) Setting the Virtual Screen 551

The presenter P5 sets the presenter's own image as the image projected from the projector 520 onto the screen 510 by the image change switch 574 of the communication box 570. The presenter P5 positions the camera section 560 nearly horizontally, extends the vertical portion 552a of the arm 552 if necessary, rotates the horizontal section 552b horizontally, and directs the photographing section 560 of the camera section 560 to the presenter P5.

While photographing the direction of the presenter P5 with the camera 5 set to perform wide-angle photographing by lowering the magnification of the zoom lens 562, the presenter P5 stops the communication box 570 held with the right hand at a lower left position in a right-side space, turns on the reference point setting switch 572 and marks the reference point A5 which is the position of the light emitting section 571 (in step S501). The camera section 560 automatically searches for the light emitting section 571 while panning and changing the tilt angle according to need (in step S502). If the photographing element 561B photographs the light emitting section 571 as the reference point A5 (in step S503), the recognition display section 53 flickers (in step S504). The position of the reference point A5 is input into the control section 530.

Next, the reference point setting switch 572 is temporarily turned off, the presenter P5 extends the right arm to stop the light emitting section 571 of the communication box 560 at an upper right position in the right-side space, turns on the reference point setting switch 572, and marks the reference point B5 which is a corner point orthogonal to the reference point A5 (in step S505). If the photographing element 561B photographs the light emitting section 571 as the reference point B5 (in step S506), the recognition display section 53 flickers (in step S507). The position of the reference point B5 is input into the control section 530.

Thereafter, the camera section 560 automatically zooms in by increasing the magnification of the zoom lens 562 and, if necessary, pans and tilts, thereby zooming in on a virtual screen 511 which is set based on an orthogonal line which connects the reference points A5 and B5 within the field of view of the camera section 560 (in step S508). FIG. 43 shows the field of view V5 of the camera section 560 in this state. Next, the control section 530 generates XY coordinates of the rectangular virtual screen 511 shown in FIG. 43 based on the orthogonal line which connects the fixed reference points A and B photographed by the camera section 560 (in step S509). The fixed virtual screen 511 is thus set on the right side of the presenter P5 and the value of the pan, the value of the tilt, and the magnification are stored as preset values in order to photograph the virtual screen 511 by the photographing elements 561B.

(2) Presenter P5's Pointing Operation

While turning on the pointer switch 573 of the communication box 570 and setting the infrared light photographing state, based on the above-described preset value, the presenter P5 performs a pointing operation to move the light emitting section 571 on the virtual screen 511 (in step S510). The position of the light emitting section 571 is continuously photographed by the photographing elements 561B and is input into the control section 530, and the control section 530 calculates the coordinates of the light emitting section 571 on the coordinates of the virtual screen 511 (in step S511). Furthermore, the control section 530 transforms the coordinates of the light emitting section 571 to those on the screen 511 and generates coordinates of a point image (in step S512).

On the other hand, the personal computer 540 outputs image data to the control section 530. This image data does not include the point image to be projected onto the screen 510. The control section 530 synthesizes a predetermined point image at the position of the coordinates of the point image in the personal computer image (in step S513). The image data is thus generated. This image data is output to the projector 520 and the projector 520 projects the image obtained by synthesizing the point image with the personal computer image (in step S514). As a result, the point image is projected at a point on the screen 510 which corresponds to the position of the light emitting section 571 on the virtual screen 511. The presenter P5 appropriately moves the light emitting section 571 of the communication box 570 and performs the pointing operation while viewing the point image projected onto the screen 510.

(2) Pointing Operation on the Material on the Material Presenting Device

Figure 45:
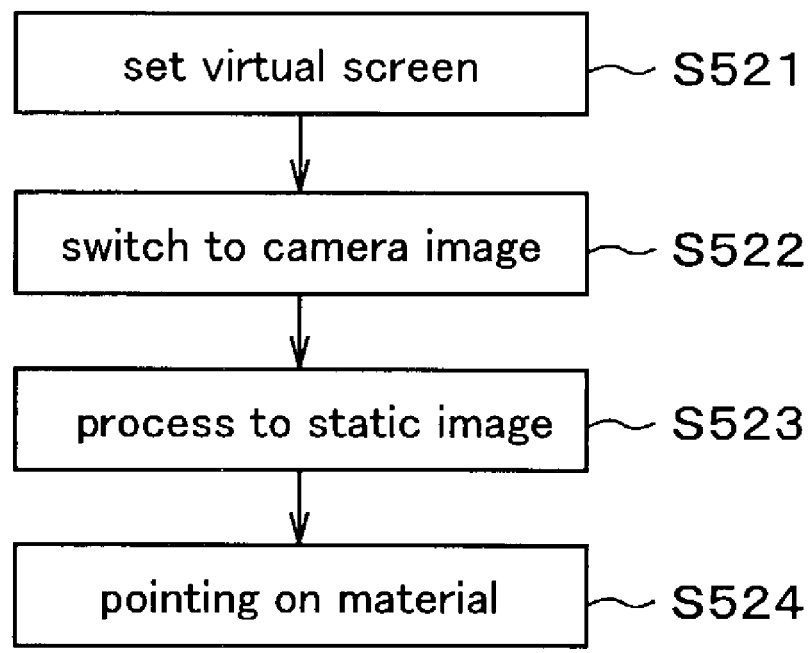
FIG. 45 is a flow chart showing other operations of the presentation system in the eighth embodiment according to the present invention.

The operation in which the image of a material such as a document mounted on the material mounting pedestal 551 of the material presenting device 550 is projected onto the screen 510 and the presenter P5 performs a pointing operation on the material directly is described below with reference to FIG. 45. This operation is executed, for example, in the case of projecting a hand written document which is not contained in the personal computer 540 onto the screen 510 in the presentation.

First, the camera section 560 is directed downward and the arm 552 is appropriately operated, whereby the camera section 560 can photograph the material which is mounted on the material mounting pedestal 551. In the same manner as described above, the virtual screen 511 is set within the photographing direction of the camera section 560 on the material mounting pedestal 551 (in step S521). In the case in which the setting of the virtual screen 511, the photographing direction of the camera section 560 is limited to be on the material mounting pedestal 551 and thus is fixed, whereby the virtual screen 511 may be set beforehand. Next, the image projected from the projector 520 onto the screen 510 is switched to the camera image by the image change switch 574 of the communication box 570 (in step S522). As a result, the material mounted on the material mounting pedestal 551 is photographed by the photographing element 561A for normal photographing, and the photographed image (material image) is projected from the projector on the screen 510.

Next, the control section 530 processes to be the material image by the photographing element 561A as a static image, the static image is output to the projector 520, and the static image is projected onto the projector 520 (in step S523). In this state, the light emitting section 571 of the communication box 570 or the light pen is appropriately moved on the material, whereby the pointing operation is performed (in step S524). As a result, the point image which corresponds to the position of the light emitting section 571 photographed by the photographing element 561B is synthesized with the static image of the material projected onto the screen 510. As described-above, the image by the photographing element 561A is processed to be a static image and the photographing element 561B photographs the light emitting section 571, and the point image of the light emitting section 571 is synthesized with the static image, whereby the shadow of the communication box 570 or the hand of the presenter P5 does not fall on the screen and the material, and the material image can be seen accurately and clearly while the pointing operation is performed on the material image.

In addition, it is possible to directly indicate on the material when the virtual screen 511 is corresponded to an object such as the material.

Instead of the above pointing operation using the light emitting section 571 described above, the light emitting section 571 or the light pen is continuously moved on the material while emitting light, whereby it is possible to draw characters. In this case, the control section 530 inputs into the light emitting section 571 as image data, calculates coordinates of the light emitting section 571 on the virtual screen 511 of the material, generates a point image, and synthesizes a point image with the point image which existed just before, of the light emitting section 571 moving on the material. The above operations are repeatedly performed, whereby the point image is continuously projected onto the position on the screen 510 which corresponds to the light emitting section 571 moving on the material, and the locus of the image is formed. As a result, it is possible to draw characters. This operation is performed in the case of "pointing at a position apart from the material presenting device".

According to the above-described embodiment, it is possible to project the material on the material mounting pedestal 551 onto the screen 510. In addition, the photographing element 561B of the camera section 560, which is for infrared light photographing, photographs the light emitting section 571, whereby it is possible to project the point image for the presentation onto the screen 510. As above-described, the presentation system does not use a conventional method of projecting a laser beam onto the screen such as a laser pointer, whereby the danger of the laser beam is basically eliminated and safety is ensured.

According to the embodiment, in normal photographing, the photographing element 561A for the normal photographing is used and the photographing element 561A photographs the emitting section 571. That is, the photographing element 561B for the infrared light photographing is used when the virtual screen 511 is generated or the pointing operation is performed, and the images of the photographing elements 561A and 561B are maintained by the control section, whereby it is possible to use the camera section 560 so that it is not necessary to switch the camera. Thus, it is not necessary to require the conventional switching operation for the optical filter which is removably positioned in the optical path of a camera so as to switch between normal photographing and specific wavelength light photographing. In addition, the device for removably placing in an optical filter is not needed, whereby the structure of the camera section 560 can be designed simply.

The presenter, the audience, or the entire meeting venue may be set to be an object for the normal photographing, instead of the material in the embodiment. In this case, the camera section 560 is positioned approximately horizontally and the horizontal portion 552b of the arm is rotated appropriately. This object is projected onto the screen 510, whereby it is possible to make the presentation more flexible in the presentation. It is possible for the communication box 570 to operate the arm 552 (extend the vertical portion 552a and rotate the horizontal portion 552b) or perform oscillating actions of the camera section 560 under remote control, whereby normal photographing can be performed smoothly.

In addition, the coordinates of the virtual screen 511 and the light emitting section 571 are calculated by image processing techniques. Thus, it is possible to compensate for shaking of the hand or to generate the point image of a shape ranging from not only a circle and a line but also an arrow and a hand, whereby it is possible to project a static point image onto the screen 510 and to transform the point image thereof to complicated and various images.

The photographing element 561B for the infrared light photographing may be a monochrome photographing element since the photographing element 561B can photograph the light emitting section 571. In addition, a beam splitter which divides light into an infrared light component and the other light components is used, whereby it forms the photographing optical path for infrared light photographing not using the optical filter 564. Thus, the structure of the camera section 560 can be designed to be more simple and light can be efficiently used.

What is claimed is:

1. A presentation system comprising:
   a virtual screen
   a display for setting the virtual screen;
   a pointing mark for operating a point on the virtual screen;
   a photographing device for photographing the pointing mark and the virtual screen;
   a displaying device for displaying a predetermined image or a photographed image photographed by the photographing device; and
   a control device,
   wherein the control device calculates coordinates of the pointing mark on coordinates of the virtual screen and has a pointing function for synthesizing a predetermined point image on coordinates of the image on the displaying device, which correspond to the coordinates of the pointing mark, and
   wherein when at least two arbitrary reference points are set on the display, the photographing section photographs the reference points, and coordinates of the virtual screen are generated by an image processing technique from a photographed image of the reference points photographed by the photographing section, so that the virtual screen is set to have a rectangular area based on the reference points.

2. A presentation system according to claim 1, wherein the control device draws by connecting movements of the coordinates of the point image end to end.

3. A presentation system according to claim 1, wherein the photographing device comprises an optical filter which enables the photographing device to photograph only light of a specific wavelength and which can be removably placed in a photographing optical path, and the pointing mark is composed of a light emitting section for emitting light including light of the specific wavelength.

4. A presentation system according to claim 3, wherein the light of a specific wavelength is infrared light.

5. A presentation system according to claim 1, wherein an image generated by a personal computer or an image made by synthesizing the point image with the image generated by the personal computer is displayed on the display.

6. A presentation system according to claim 5, wherein the control device calculates the distance of movement of the pointing mark and transmits the distance of the movement as mouse data to the personal computer.

7. A presentation system according to claim 1, wherein an image photographed by the photographing device or an image made by synthesizing the point image with the image photographed by the photographing device is displayed on the display.

8. A presentation system according to claim 1, wherein predetermined data and data characteristic information related with the predetermined data are registered in the control device, resources of an image on the display store the data characteristic information as an information form including at least one of a bar code, a two-dimensional bar code, a character, and a mark, and when the position of the information form in the image on the display is indicated, the control device recognizes the information form through the photographing device and outputs the predetermined data related to the information form.

9. A presentation system according to claim 8, wherein the predetermined data is an image, and the image is displayed on the display and/or the displaying device.

10. A presentation system according to claims 8, wherein the predetermined data is voice data, and the voice data is output to a voice generating device.

11. A presentation system according to claim 8, wherein the data characteristic information is a command executing function.

12. A presentation system according to claim 11, wherein the command executing function is page information of an image.

13. A presentation system according to claim 1, wherein the control device generates the point image in an arbitrary shape which is at least one of a dot, a circle, an arrow, a line and a hand.

14. A presentation system according to claim 1, wherein the presentation system further comprises light emitting points at three of four corner points of the display at least, wherein, when a shape made by connecting the positions of the light emitting points is distorted into a trapezoid shape on the photographed image photographed by the photographing device, the distorted shape on the photographed image is corrected based on the positions of the light emitting points.

15. A presentation system according to claim 1, the presentation system further comprising:
   light emitting sections provided on the display wherein the reference points are light emitting points formed by the light emitting section.

16. A presentation system according to claim 1, wherein the reference points are light emitting points formed by using the pointing mark.

17. A presentation system comprising:
   a photographing section for photographing a material;
   a pointing mark photographed by the photographing section;
   a virtual screen on which a point operation is performed by using the pointing mark;
   a control section for generating a point image by transforming the position of the pointing mark on the virtual screen to screen coordinates of an image displaying device;
   an image maintaining device which is other than the photographing section;
   an image synthesizing section for synthesizing the point image with an image supplied by the photographing section or the image maintaining device; and
   an image outputting section for outputting the image synthesized by the image synthesizing section to the image displaying device,
   wherein when at least two arbitrary reference points are set in an arbitrary range in an angle of view of the photographing section by using the pointing mark, the photographing section photographs the reference points, and coordinates of the virtual screen are generated by an image processing technique from a photographed image of the reference points photographed by the photographing section, so that the virtual screen is set to have a rectangular area based on the arbitrary reference points.

18. A presentation system according to claim 17, wherein a photographing direction of the photographing section can be changed arbitrarily.

19. A presentation system according to claim 17, wherein the image maintaining device is at least one of a personal computer, an external memory device in which an image is stored, and an internal memory device in which an image is stored.

20. A presentation system according to claim 17, wherein the pointing mark is a reflecting object which has a high reflectance with respect to a background, is a light emitting object which is bright with respect to a background and is illuminated or flickers, or is an object which is of a different color from a background color.

21. A presentation system according to claim 17, wherein the pointing mark is composed of a light emitting object which flickers, and the presentation system further comprises a flickering light emitting object sensing device which recognizes the light emitting object as the pointing mark, based on the flickering cycle of the flickering light emitting object.

22. A presentation system according to claim 17, wherein the control section generates the point image in an arbitrary shape which is at least one of a dot, a circle, an arrow, and a line.

23. A presentation system according to claim 17, wherein the image synthesizing section forms the point image as a continuous line by following the movements of the pointing mark.

24. A presentation system according to claim 17, wherein predetermined data and data characteristic information related with the predetermined data are registered in the control section, resources of an image, which is supplied by the photographing section or the image maintaining device other than the photographing section, store the data characteristic information as an information form a bar code, a two-dimensional bar code, a character, or a mark, and when the position of the information form in the image on the image displaying device is indicated, the control section recognizes the information form through the photographing section and outputs the predetermined data related to the information form.

* * * * *